(12) United States Patent
Tomizawa et al.

(10) Patent No.: US 8,189,920 B2
(45) Date of Patent: May 29, 2012

(54) IMAGE PROCESSING SYSTEM, IMAGE PROCESSING METHOD, AND IMAGE PROCESSING PROGRAM

(75) Inventors: Hajime Tomizawa, Shizuoka-ken (JP); Akihiko Fujiwara, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1186 days.

(21) Appl. No.: 11/966,330

(22) Filed: Dec. 28, 2007

(65) Prior Publication Data

US 2008/0170786 A1 Jul. 17, 2008

Related U.S. Application Data

(60) Provisional application No. 60/885,286, filed on Jan. 17, 2007.

(30) Foreign Application Priority Data

Oct. 1, 2007 (JP) .................... 2007-257287

(51) Int. Cl.
*G06K 9/46* (2006.01)
*G06K 9/72* (2006.01)
(52) U.S. Cl. .......................... 382/182; 382/192; 382/229
(58) Field of Classification Search .................. 382/181, 382/182, 229, 224, 226, 155, 159, 276, 305, 382/176, 173, 190, 195, 199, 232, 242, 209, 189, 187; 707/999.104, 999.1, 999.103, 999.001, 999.003, E17.001, E17.019, E17.026, 999.004, 999.005, 999.107, 999.002; 715/700, 863, 764, 853, 202, 201, 234, 204
See application file for complete search history.

(56) References Cited

U.S. PATENT DOCUMENTS

| | | | |
|---|---|---|---|
| 7,689,037 B2 * | 3/2010 | Handley et al. | 382/173 |
| 7,778,953 B2 * | 8/2010 | Fujiwara | 706/62 |
| 7,787,712 B2 * | 8/2010 | Takahashi et al. | 382/305 |
| 2004/0223181 A1 * | 11/2004 | Narusawa | 358/1.15 |
| 2008/0201636 A1 | 8/2008 | Fujiwara | |

FOREIGN PATENT DOCUMENTS

JP 11-250041 9/1999
JP 2001-344562 12/2001

* cited by examiner

*Primary Examiner* — Sheela Chawan
(74) *Attorney, Agent, or Firm* — Turocy & Watson, LLP

(57) ABSTRACT

A technique that can contribute to a reduction in an operation burden in managing a processing result of semantic determination processing applied to objects included in an image is provided. An object included in an image of image data is extracted. A semantic of the object in a layout of the image data is determined. When it is determined that plural objects have an identical semantic, a display unit is caused to notify information concerning the plural objects, which are determined as having the semantic, in association with information concerning the semantic.

20 Claims, 21 Drawing Sheets

APPLICATION GUIDE

SUBMISSION
DESTINATION

· ○△□△CHARGE  :  TOKYO TARO

· □△CHARGE      :  OSAKA JIRO http://www.abcdefg/                    1/2

FIG.7

| CHARACTER AREA | CHARACTER AREA ATTRIBUTE (ORDER OF LIKELIHOOD OF ANALYSIS RESULT) |
|---|---|
| CHARACTER AREA1 | |
| CHARACTER AREA2 | 1 |
| CHARACTER AREA3 | 2 |
| CHARACTER AREA4 | |
| CHARACTER AREA5 | |
| CHARACTER AREA6 | |
| CHARACTER AREA7 | |

FIG.11

| DOCUMENT NUMBER | DOCUMENT INFORMATION | CORRECTION INFORMATION |
|---|---|---|
| DOCUMENT A | NUMBER OF CHARACTER AREAS : 7<br>CHARACTER AREA 1 : (80,10)-(120,20)<br>CHARACTER AREA 2 : (10,30)-(120,50)<br>CHARACTER AREA 3 : (15,70)-(40,80)<br>CHARACTER AREA 4 : (30,90)-(120,100)<br>CHARACTER AREA 5 : (30,110)-(100,120)<br>CHARACTER AREA 6 : (10,150)-(60,160)<br>CHARACTER AREA 7 : (90,150)-(120,160) | EXCLUDE SECOND [TITLE] CHARACTER AREA FROM CANDIDATES |
| DOCUMENT B | NUMBER OF CHARACTER AREAS : 4<br>CHARACTER AREA 1 : (30,20)-(60,30)<br>CHARACTER AREA 2 : (30,40)-(100,50)<br>CHARACTER AREA 3 : (20,70)-(160,120)<br>CHARACTER AREA 4 : (120,130)-(150,140) | CHANGE ORDER OF CHARACTER AREA THIRD LIKELY TO BE [TITLE] TO FIRST<br>CHANGE ORDER OF CHARACTER AREA MOST LIKELY TO BE [TITLE] TO THIRD |
| ... | ... | ... |

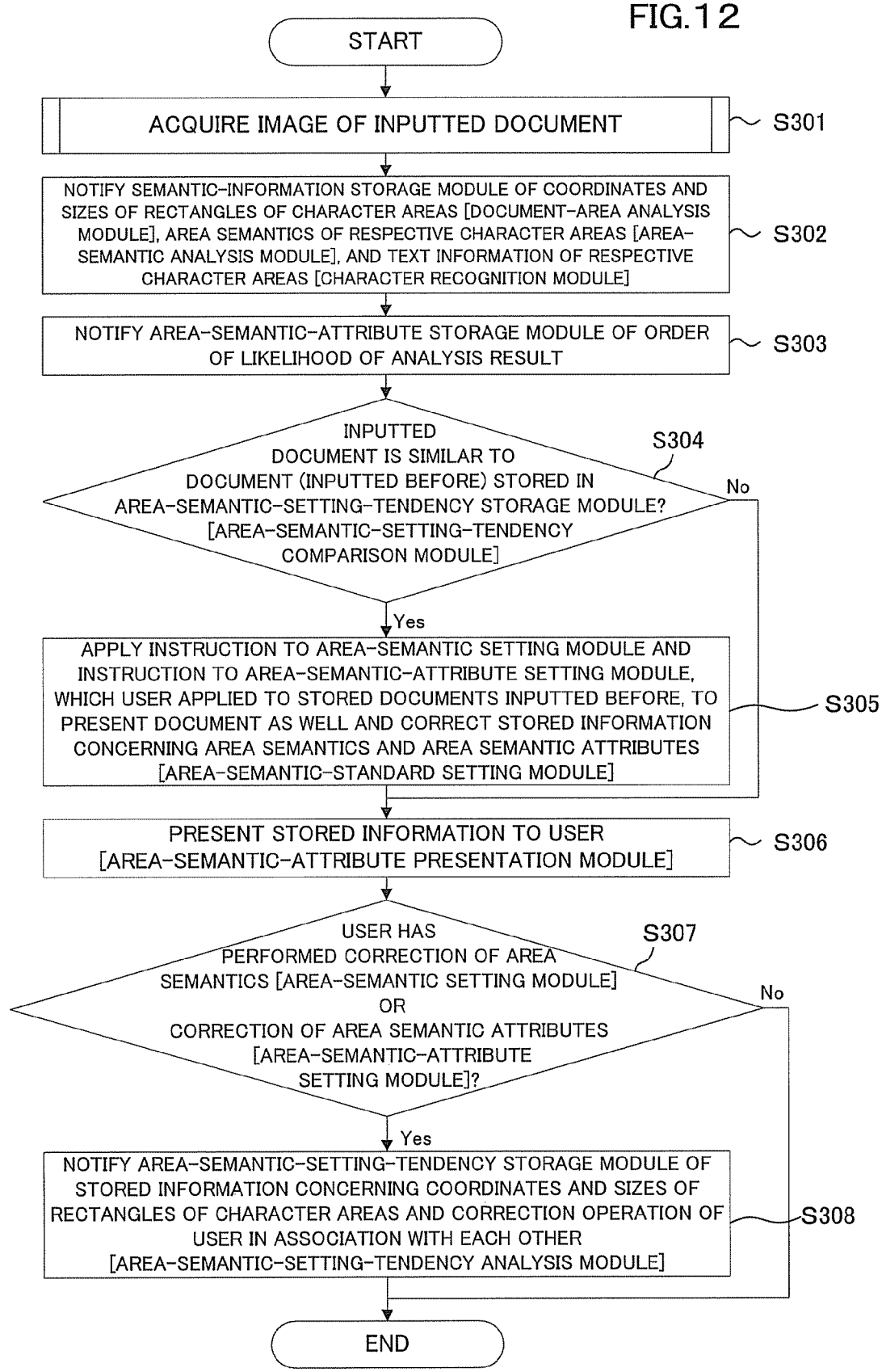

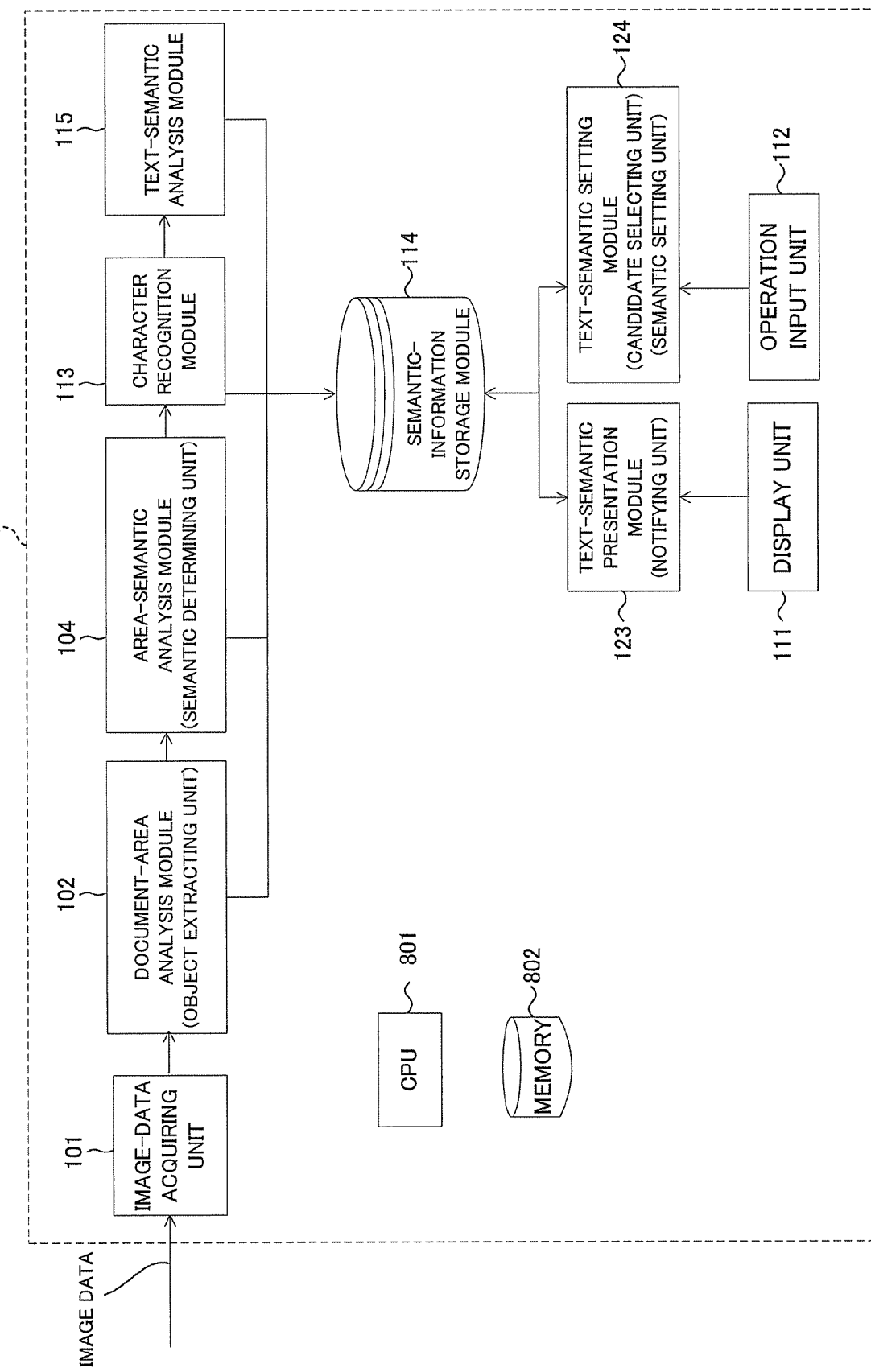

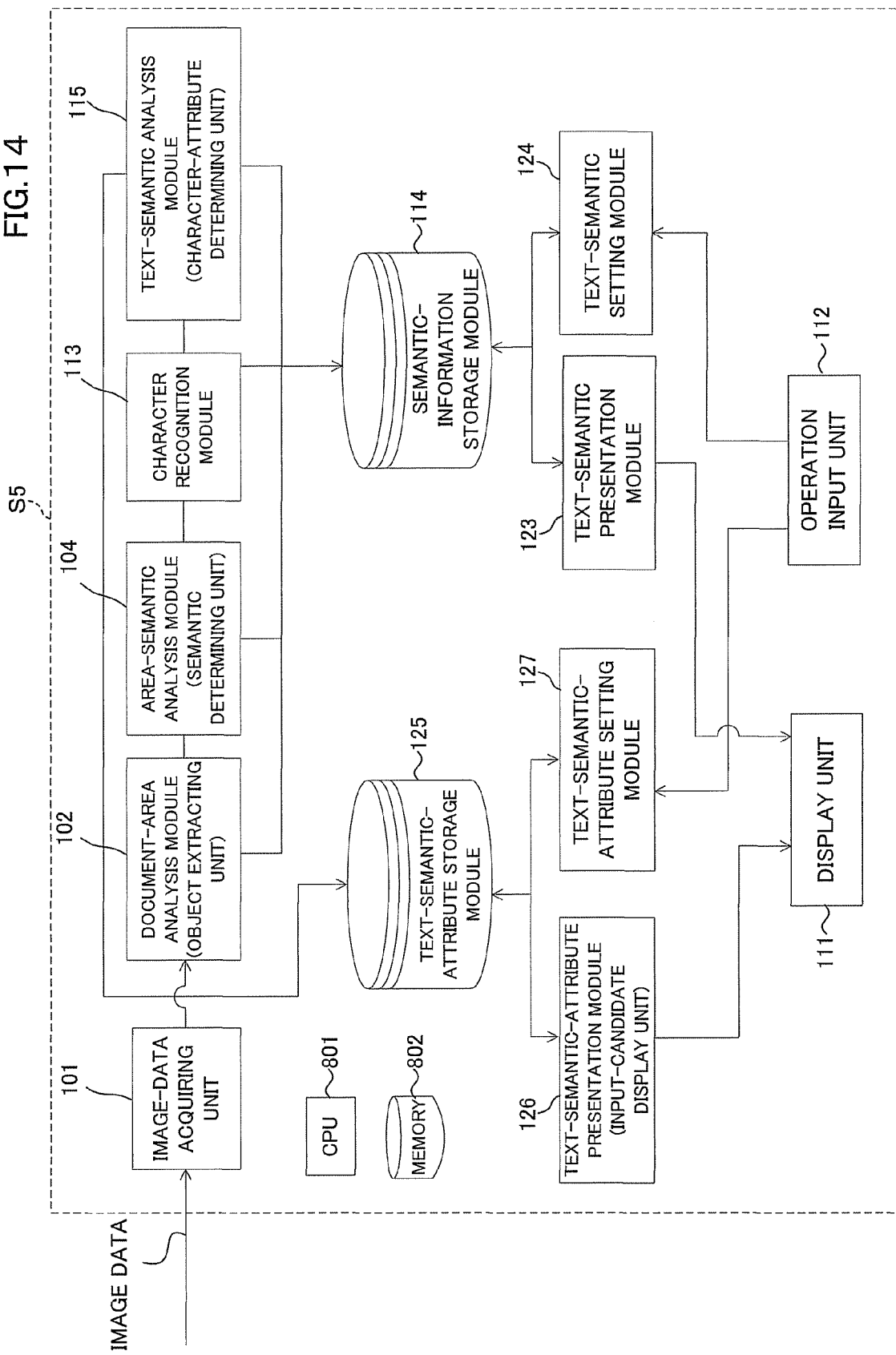

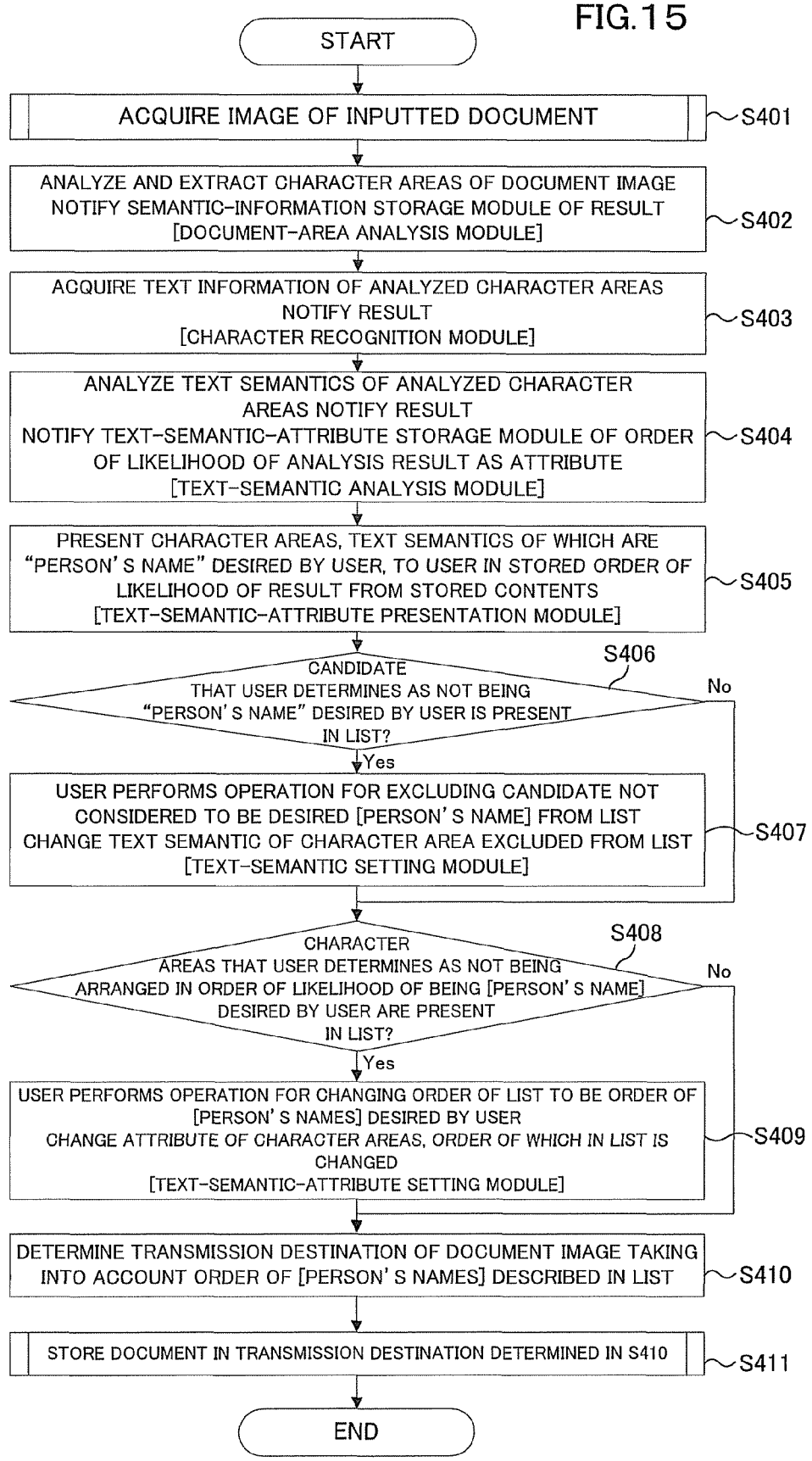

FIG.16

| CHARACTER AREA | CHARACTER AREA ATTRIBUTE (ORDER DESIRED BY USER) |
|---|---|
| CHARACTER AREA1 | |
| CHARACTER AREA2 | |
| CHARACTER AREA3 | |
| CHARACTER AREA4 | 1 |
| CHARACTER AREA5 | 2 |
| CHARACTER AREA6 | |
| CHARACTER AREA7 | |

FIG.20

| DOCUMENT NUMBER | DOCUMENT INFORMATION | CORRECTION INFORMATION |
|---|---|---|
| DOCUMENT A | NUMBER OF CHARACTER AREAS : 7<br>CHARACTER AREA 1 : (80,10)-(120,20)<br>CHARACTER AREA 2 : (10,30)-(120,50)<br>CHARACTER AREA 3 : (15,70)-(40,80)<br>CHARACTER AREA 4 : (30,90)-(120,100)<br>CHARACTER AREA 5 : (30,110)-(100,120)<br>CHARACTER AREA 6 : (10,150)-(60,160)<br>CHARACTER AREA 7 : (90,150)-(120,160) | EXCLUDE SECOND [PERSON'S NAME] ITEM FROM LIST |
| DOCUMENT B | NUMBER OF CHARACTER AREAS : 4<br>CHARACTER AREA 1 : (30,20)-(60,30)<br>CHARACTER AREA 2 : (30,40)-(100,50)<br>CHARACTER AREA 3 : (20,70)-(160,120)<br>CHARACTER AREA 4 : (120,130)-(150,140) | CHANGE ORDER OF THIRD [PERSON'S NAME] ITEM TO FIRST<br>CHANGE ORDER OF FIRST [PERSON'S NAME] ITEM TO THIRD |
| ... | ... | ... |

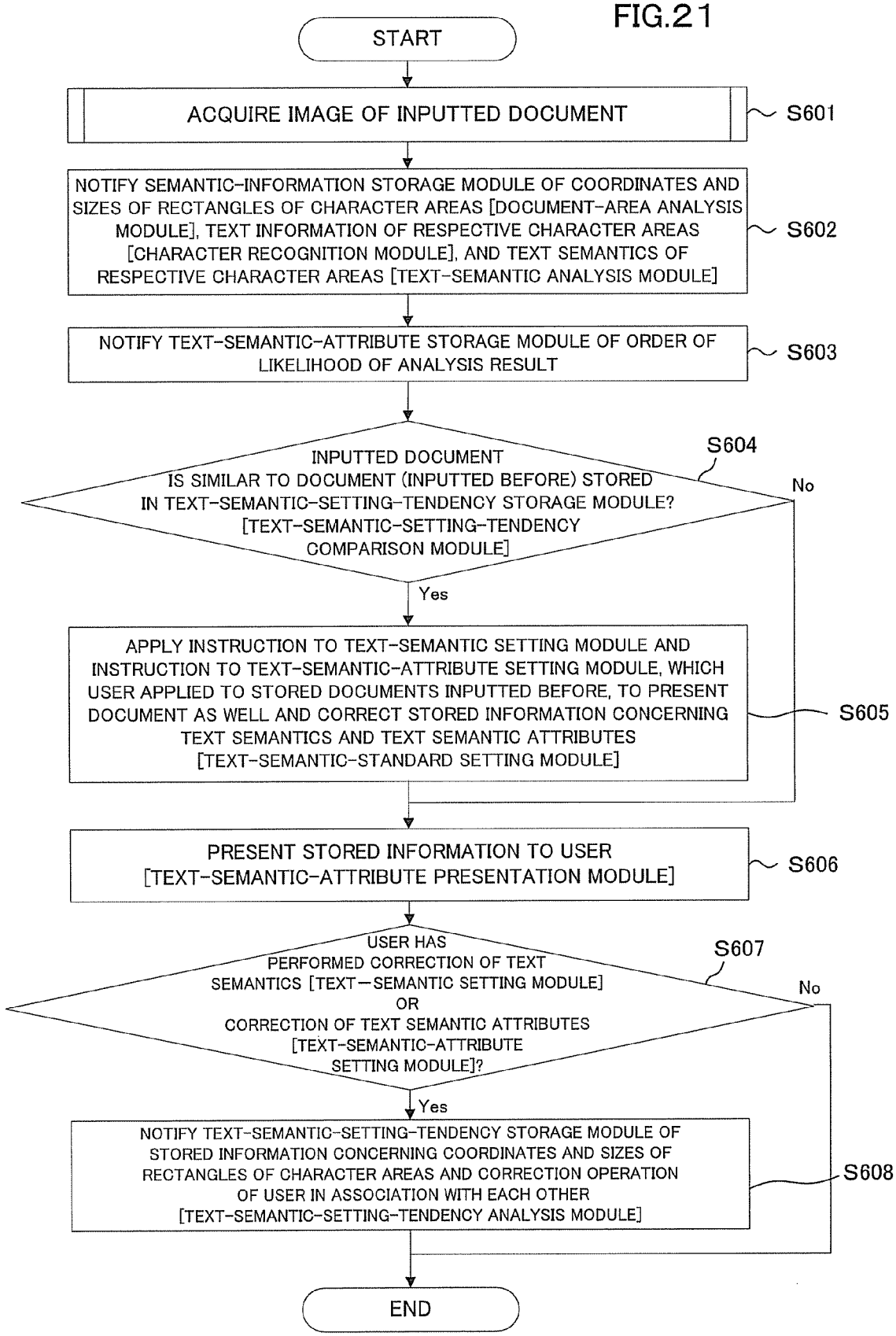

IMAGE PROCESSING SYSTEM, IMAGE PROCESSING METHOD, AND IMAGE PROCESSING PROGRAM

BACKGROUND OF THE INVENTION

1. Field of the Invention

The present invention relates to a technique for extracting objects included in an image of image data and giving semantics to the extracted objects in a layout of the image data.

2. Description of the Related Art

In the past, there is known an image processing system that scans a paper original to convert the paper original into electronic data, applies area analysis to document image information of the electronic data to extract objects such as character areas, acquires text information of the character areas by performing OCR processing, and performs predetermined processing on the basis of this text information.

The image processing system in the past extracts a semantic (a title, a header, a paragraph of a text, etc.) of a certain character area in a layout and extracts an attribute (e.g., a character string "2006/01/25" is "date") of a text in text information of the character area (see, for example, JP-A-11-250041).

There is also known a technique for making it possible to correct, using an interface such as a GUI, semantics determined for objects extracted from an image of image data and an attribute determined for a text (see, for example, JP-A-2001-344562).

The image processing system in the past can notify a user of only a single semantic finally determined for an object included in an image. Therefore, the user has to determine, on the basis of only the single semantic finally determined, whether semantic determination processing automatically performed in the image processing system is proper.

When the user desires to correct a result of semantic determination automatically applied to an object included in an image (e.g., when a certain object, a semantic of which is determined, is not appropriate, change the object to an appropriate object), the user also has to determine correction candidates that the user himself or herself considers appropriate. This imposes a burden on operation by the user.

SUMMARY OF THE INVENTION

It is an object of an embodiment of the present invention to provide a technique that can contribute to a reduction in an operation burden when management of a processing result of semantic determination processing applied to an object included in an image is performed.

In order to solve the problem described above, an image processing system according to an aspect of the present invention includes an image-data acquiring unit that acquires image data, an object extracting unit that extracts an object included in an image of the image data acquired by the image-data acquiring unit, a semantic determining unit that determines, on the basis of predetermined determination rules, a semantic of the object extracted by the object extracting unit in a layout of the image data, and a notifying unit that notifies information concerning the object extracted by the object extracting unit and information concerning the semantic determined for the object by the semantic determining unit in association with each other.

An image processing method according to another aspect of the present invention includes acquiring image data, extracting an object included in an image of the acquired image data, determining, on the basis of predetermined determination rules, a semantic of the extracted object in a layout of the image data, and notifying information concerning the extracted object and information concerning the semantic determined for the object in association with each other.

An image processing program according to still another aspect of the present invention causes a computer to execute processing for acquiring image data, extracting an object included in an image of the acquired image data, determining, on the basis of predetermined determination rules, a semantic of the extracted object in a layout of the image data, and notifying information concerning the extracted object and information concerning the semantic determined for the object in association with each other.

DESCRIPTION OF THE DRAWINGS

FIG. 2 is a diagram showing an example of a processing object document;

FIG. 7 is a diagram showing an example of a data table stored in an area-semantic-attribute storage module 116;

FIG. 11 is a diagram showing a state in which coordinates of respective character areas of documents and contents of correction operation that the user applied to document images similar to the documents in the past are associated with each other;

FIG. 12 is a flowchart for explaining details of processing in the image processing system S3 according to the third embodiment;

FIG. 13 is a functional block diagram showing a configuration of an image processing system S4 according to a fourth embodiment of the present invention;

FIG. 14 is a functional block diagram showing a configuration of an image processing system S5 according to a fifth embodiment of the present invention;

FIG. 15 is a flowchart for explaining details of processing of the image processing system S5 according to the fifth embodiment;

FIG. 16 is an example of a data table showing text semantic attributes stored in a text-semantic-attribute storage module 125;

FIG. 20 is a diagram showing a state in which coordinate information in documents of objects such as character areas and contents of correction operation that a user applied to attribute information and the like determined for these character areas in the past are stored in pairs; and FIG. 21 is a flowchart for explaining details of processing for reflecting correction operation in the past on a document inputted anew in the sixth embodiment.

DESCRIPTION OF THE EMBODIMENTS

Embodiments of the present invention will be hereinafter explained with reference to the accompanying drawings.

First Embodiment

First, a first embodiment of the present invention is explained.

Figure 1:
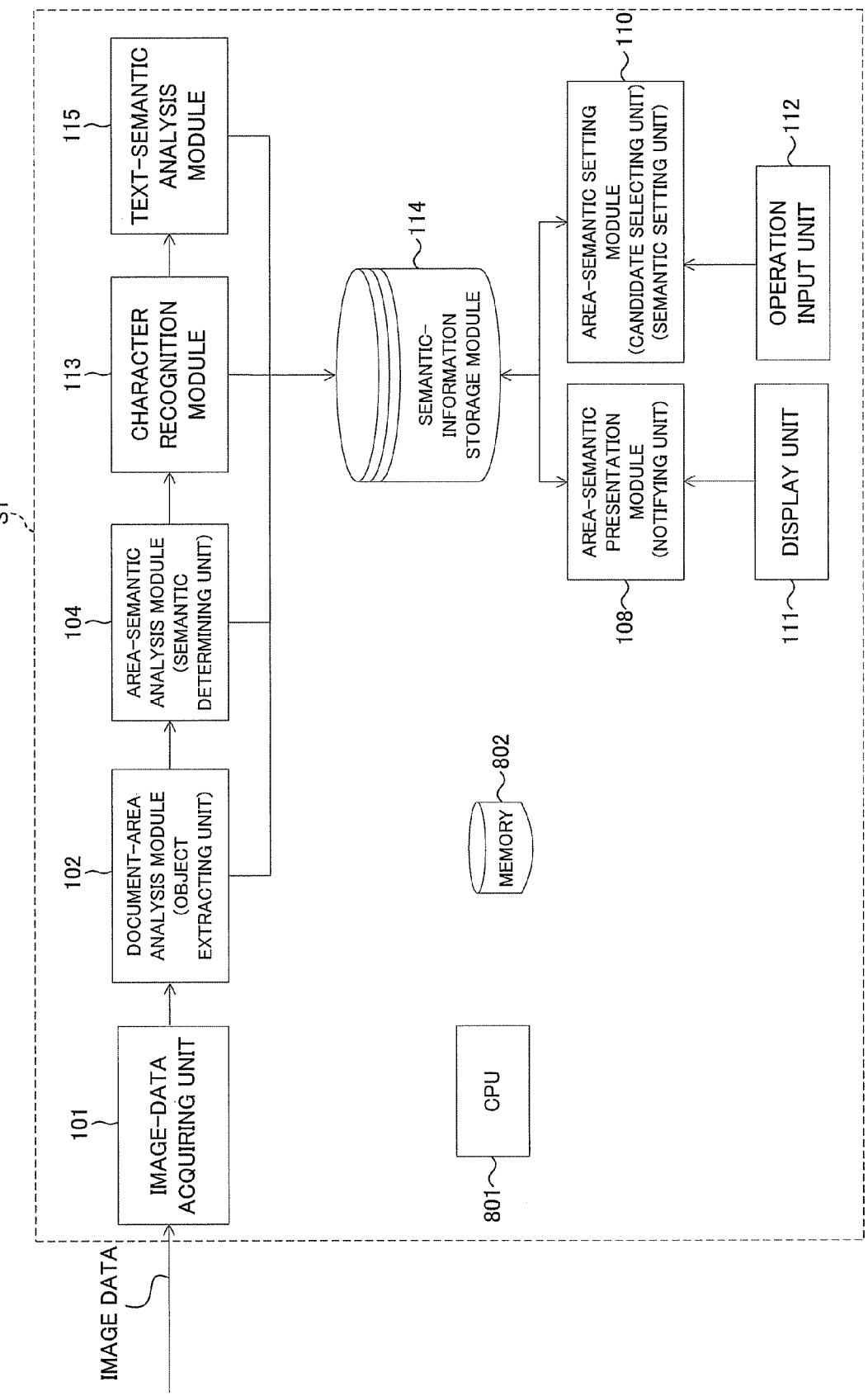
FIG. 1 is a functional block diagram for explaining an image processing system S1 according to a first embodiment of the present invention.

FIG. 1 is a functional block diagram for explaining an image processing system S1 according to the first embodiment.

The image processing system S1 according to this embodiment includes an image-data acquiring unit 101, a document-area analysis module 102, an area-semantic analysis module 104, an area-semantic presentation module 108, an area-semantic setting module 110, a display unit 111, an operation input unit 112, a character recognition module 113, a semantic-information storage module 114, a text-semantic analysis module 115, a CPU 801, and a memory 802. The image processing system S1 can be realized by, for example, an MFP (Multi Function Peripheral) including these units.

The image-data acquiring unit 101 acquires processing object image data in the image processing system S1. In an example explained below, image data obtained by scanning an original is acquired. However, the processing object image data in the image processing system S1 is not limited to this. Any image data eventually converted into an electronic form can be an object of data acquisition in the image-data acquiring unit 101.

The document-area analysis module (equivalent to an object extracting unit) 102 extracts objects included in an image of the image data acquired by the image-data acquiring unit 101. Specifically, the document-area analysis module 102 analyzes, for example, positions and sizes of rectangular areas surrounding character strings (or position coordinates on the upper left and position coordinates on the lower right of the rectangular areas) in the image of the image data and extracts objects such as character areas included in the image of the image data.

The area-semantic analysis module (equivalent to a semantic determining unit) 104 analyzes (determines), on the basis of predetermined determination rules stored in a storage area of the memory 802 or the like, semantics (e.g., "title", "header", "footer", and "paragraph") of the objects extracted by the object extracting unit 102 in a layout of the image data. An analysis result (semantics of respective objects) in the area-semantic analysis module 104 is stored in the semantic-information storage module 114 in association with the respective objects.

When the area-semantic analysis module 104 determines, on the basis of various kinds of information stored in the semantic-information storage module 114, that plural objects have an identical semantic (e.g., determines that plural objects are "title"), the area-semantic presentation module (equivalent to a notifying unit) 108 causes the display unit 111 to display information concerning the plural objects determined as having the semantic as a list in association with information concerning the semantic. Consequently, a user can easily grasp what kind of semantic the objects included in the image is determined to have (an analysis result).

The area-semantic setting module (equivalent to a candidate selecting unit and a semantic setting unit) 110 selects, on the basis of an operation input to the operation input unit 112 by the user, any one of objects displayed on the display unit 111 as a list according to a command from the area-semantic presentation module 108. The area-semantic setting module 110 sets the object selected as described above to have a semantic determined for the object in the area-semantic analysis module 104.

The display unit 111 includes a liquid crystal display or a CRT display and has a role of displaying a processing result and the like in the image processing system S1 on a screen. Specifically, the display unit 111 can be realized by, for example, a GUI screen of a control panel of an MFP or a GUI screen of a PC.

The operation input unit 112 includes a keyboard and a mouse and has a role of receiving an operation input of the user. It goes without saying that the functions of the display unit 111 and the operation input unit 112 may be integrally realized by, for example, a touch panel display.

The character recognition module 113 has a function of recognizing characters as text information from character images included in an image of image data.

The semantic-information storage module 114 includes a storage device such as an HDD and has a role of collectively storing processing results in the document-area analysis module 102, the area-semantic analysis module 104, and the character recognition module 113. Other storage modules explained below also include storage devices such as HDDs and have a role of a database.

The text-semantic analysis module 115 analyzes, on the basis of the text information obtained by the character recognition module 113, text semantics (i.e., attributes such as "date", "company name", and "person's name") of characters or character strings in the character areas extracted by the document-area analysis module 102.

Specifically, the text-semantic analysis module 115 analyzes that, for example, an attribute of a character string "2006/01/25" included in text information of a character area extracted from an image is "date".

The CPU 801 has a role of performing various kinds of processing in the image processing system according to this embodiment and also has a role of realizing various functions by executing a program stored in the memory 802. The memory 802 includes a ROM and a RAM and has a role of storing various kinds of information and programs used in the image processing system.

Figure 3:
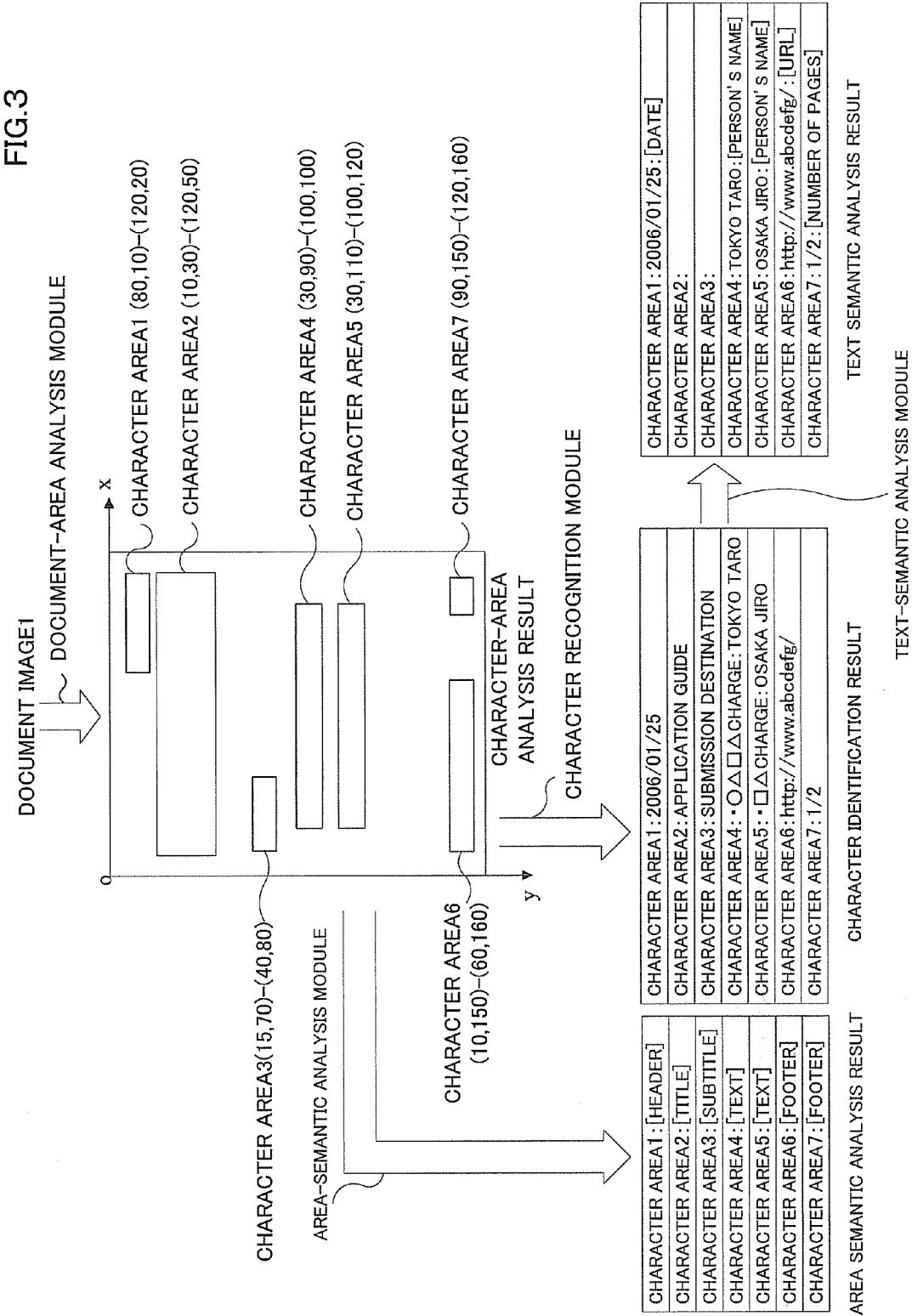
FIG. 3 is a diagram for explaining a flow of processing in the first embodiment.

Details of processing performed by the image processing system S1 according to this embodiment are explained below. As an example, predetermined processing is applied to image data obtained by scanning a document shown in FIG. 2. FIG. 3 is a diagram for explaining a flow of processing in the first embodiment.

First, the document-area analysis module 102 extracts a character area "2006/01/25" and a character area "application guide" in a document image, in which objects such as character strings are arranged in a layout shown in FIG. 2, as a character area 1 and a character area 2, respectively.

Specifically, in extracting an object such as a character area, the document-area analysis module 102 performs processing for recognizing that, with a coordinate on the upper left of the document image as an origin, the character area 1 is a rectangular area from a coordinate (80, 10) to a coordinate (120, 20). In the processing for extracting an object from an image by the document-area analysis module 102, the document-area analysis module 102 only has to be capable of specifying in which position in the document image the object is present. For example, it is possible to adopt a method of representing that "a coordinate on the upper left of a rectangular area surrounding the character area 1 is (80, 10), the width of the rectangle is 40, and the height of the rectangle is 10".

Subsequently, the area-semantic analysis module 104 analyzes semantics of the character areas extracted by the document-area analysis module 102.

For example, the area-semantic analysis module 104 analyses that the character area 1 is "header" and the character area 2 is "title" in the processing object document image.

The character recognition module 113 analyzes images of the character areas extracted by the document-area analysis module 102 and acquires text information. For example, the character recognition module 113 analyzes that text information of the character area 1 is "2006/01/25".

Various kinds of information and analysis results acquired by the document-area analysis module 102, the area-semantic analysis module 104, and the character recognition module 113 as described above are stored in the semantic-information storage module 114.

Figure 4:
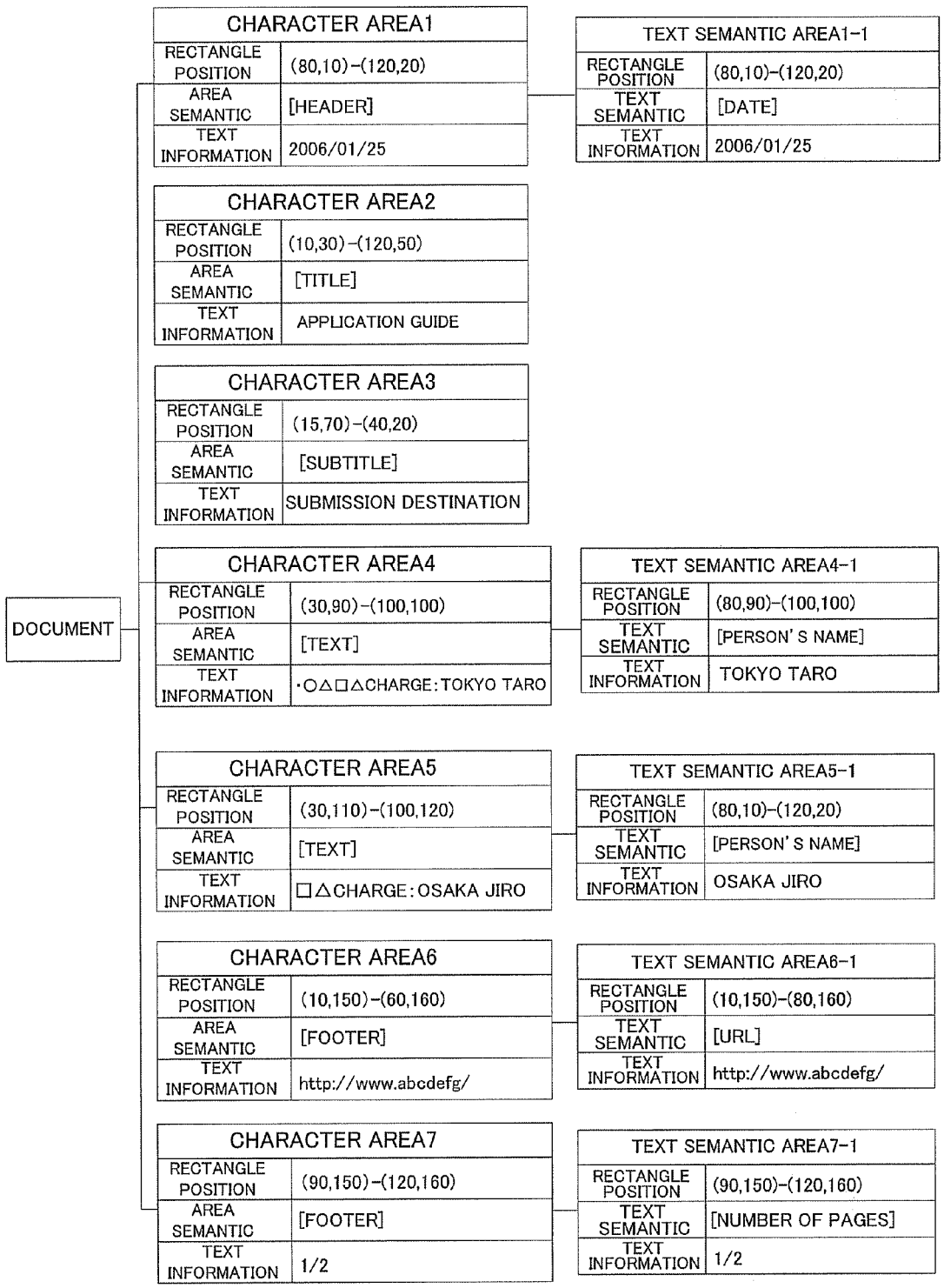
FIG. 4 is a diagram showing relations among respective kinds of information collectively stored in a semantic information storage module 114.

As shown in FIG. 3, when the text-semantic analysis module 115 can extract, besides a position of a rectangular area surrounding a character area, a semantic of the area, and text information of the area, a text semantic from a character sting in the text information, a position of a rectangular area of the character string, a text semantic of the character string, and text information of the character string are stored. If several character strings included in one character area have text semantics, respectively, the semantic-information storage module 114 can store information concerning all the text semantics. FIG. 4 is a diagram showing relations among respective kinds of information collectively stored in the semantic-information storage module 114.

Consequently, the user can set an object having a certain semantic by selecting the object out of objects displayed as a list. It is possible to substantially reduce a burden of input of correction candidates of the object.

When correction of a method of giving a semantic to an object in an image is performed through semantic determination processing by a predetermined algorithm in advance, it is possible to flexibly change the semantic of the object without substantially changing a program for causing the image processing system to execute the existing semantic determination processing.

Second Embodiment

A second embodiment of the present invention is explained.

Figure 5:
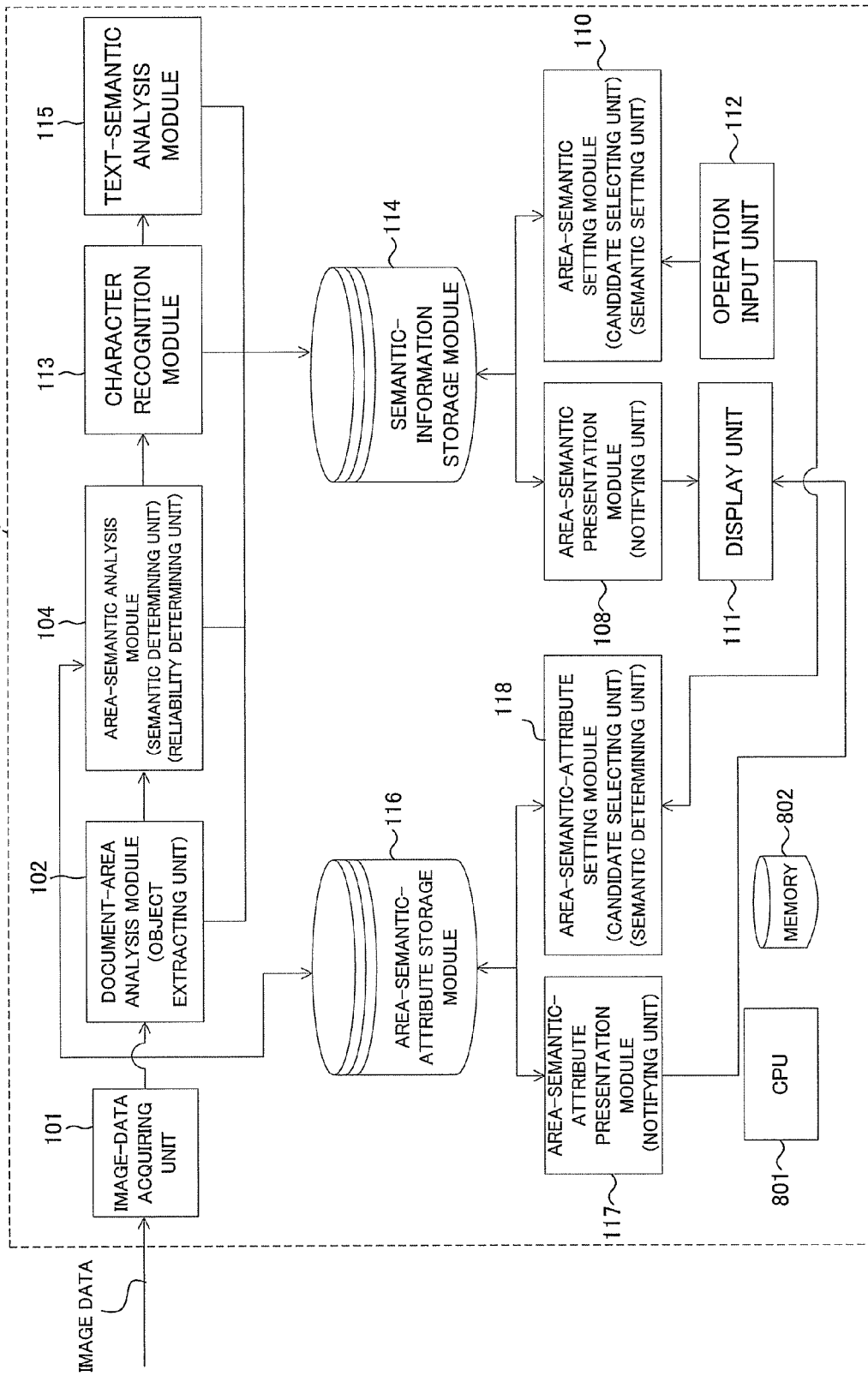
FIG. 5 is a functional block diagram for explaining an image processing system S2 according to a second embodiment of the present invention.

FIG. 5 is a functional block diagram for explaining an image processing system S2 according to the second embodiment.

This embodiment is a modification of the first embodiment described above. Components having functions same as those of the components explained in the first embodiment are denoted by the same reference numerals and signs and explanation of the components is omitted. This embodiment is different from the first embodiment in a method of displaying association between an object and a semantic on the display unit 111.

The image processing system S2 according to this embodiment further includes an area-semantic-attribute storage module 116, an area-semantic-attribute presentation module 117, and an area-semantic-attribute setting module 118 in addition to the units of the image processing system S1 according to the first embodiment. The area-semantic analysis module 104 according to this embodiment has a function (equivalent to a function of a reliability determining unit) of determining likelihood (reliability) of semantic analysis processing (semantic determination processing) for an object performed by the area-semantic analysis module 104 in addition to the functions described in the first embodiment.

The area-semantic-attribute storage module 116 has a role of acquiring attribute information such as reliability of a result of area-semantic determination processing executed by the area-semantic analysis module 104 and storing the information.

The area-semantic-attribute presentation module 117 presents information stored in the semantic-information storage module 114 according to a value of an attribute stored in the area-semantic-attribute storage module 116. Thus, in this embodiment, the area-semantic presentation module 108 and the area-semantic-attribute presentation module 117 have a function equivalent to that of a notifying unit.

The area-semantic presentation module 108 and the area-semantic-attribute presentation module 117 according to this embodiment cooperate with each other and cause, when the area-semantic analysis module 104 determines that plural objects have an identical semantic, the display unit 111 to display the plural objects determined as having the semantic as a list in association with the semantic in order from an object having highest reliability determined by the area-semantic analysis module 104.

The area-semantic-attribute setting module 118 gives means for manually setting a value of an attribute stored in the area-semantic-attribute storage module 116 to a user. Thus, in this embodiment, the area-semantic setting module 110 and the area-semantic-attribute setting module 118 have functions equivalent to those of a candidate selecting unit and a semantic setting unit.

Details of processing in the image processing system S2 according to this embodiment are explained below.

Processing for extracting text information of a character area, an area semantic of which is "title", from image data of a processing object document in the image processing system S2 and creating, on the basis of the text information, a file name in storing the image data of the processing object document in a predetermined storage device is explained.

Figure 6:
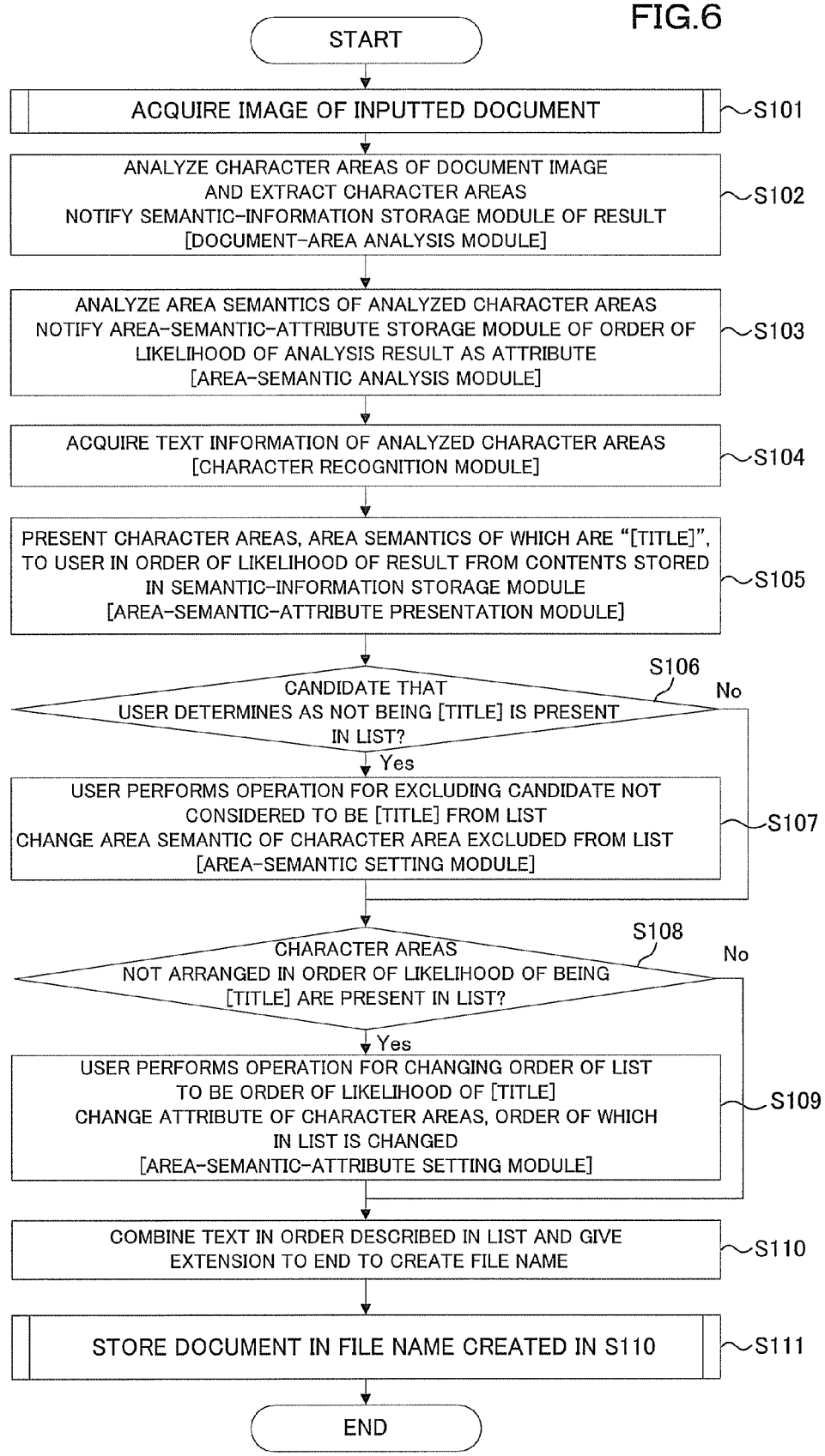
FIG. 6 is a flowchart for explaining a flow of processing in the second embodiment.

For example, when image data of the document shown in FIG. 2 is inputted to the image processing system S2 as processing object data, a file name such as "application guide-submission destination.pdf" is created from text information extracted as "title" (e.g., character strings such as "application guide" and "submission destination") and presented to the user. The user is urged to check the file name created as described above. When the file name is corrected by the user, the corrected file name is given to an image data file and stored. FIG. 6 is a flowchart for explaining a flow of the processing in the second embodiment.

First, the image-data acquiring unit 101 acquires image data of a processing object document in the document processing system S2 (S101).

Subsequently, the document-area analysis module 102 analyzes character areas in a document image and acquires coordinates (positions, sizes, etc.) of rectangles surrounding the character areas. The document-area analysis module 102 notifies the semantic-information storage module 114 of information acquired by the document-area analysis module 102 and stores the information therein (S102).

The area-semantic analysis module 104 analyzes, on the basis of predetermined determination rules stored in a storage area of the memory 802 or the like, area semantics of the character areas extracted by the document-area analysis module 102 (semantics of extracted objects in a layout of the image data). The area-semantic analysis module 104 also performs, together with semantic determining processing for objects included in the image data, determination of reliability of the semantic determination processing.

Specifically, in processing for determining reliability (likelihood) of the semantic determination processing in the area-semantic analysis module 104, for example, in determination of a character area, a semantic of which is "title", scoring for giving ten points when a certain character area is located closer to an upper side in a layout of a document and giving twenty points when a character area is large is performed. A total point obtained as a result of this scoring is set as an index of likelihood of the semantic determination processing. The total point obtained as a result of the scoring is stored in the semantic-information storage module 114.

Information concerning the area semantic acquired by the area-semantic analysis module 104 in this way is notified to the semantic-information storage module 114 and stored therein. At this point, the area-semantic analysis module 104 obtains candidate order of the respective character areas on the basis of likelihood (reliability) of correctness of an analysis result, notifies the area-semantic-attribute storage module 116 of the candidate order as an attribute, and causes the area-semantic-attribute storage module 116 to store the candidate order (S103).

Concerning the image data of the document shown in FIG. 2, when the area-semantic analysis module 104 interprets that, for example, area semantics of the character area 2, text information of which is "application guide", and the character area 3, text information of which is "submission destination", are "title", the area-semantic analysis module 104 notifies the semantic-information storage module 114 of these analysis results and causes the semantic-information storage module 114 to store the analysis results. Specifically, the area-semantic analysis module 104 notifies the area-semantic-attribute storage module 116 of order of likelihood of an analysis result, which is obtained when the area semantics are analyzed, indicating that the character area 2 is most likely to be "title" and the character area 3 is second likely to be "title" and causes the area-semantic-attribute storage module 116 to store the order in a form of, for example, a data table shown in FIG. 7 (S103).

The character recognition module 113 acquires text information of the character areas analyzed by the document-area analysis module 102. The character recognition module 113 notifies the semantic-information storage module 114 of the text information acquired by the character recognition module 113 and stores the text information therein (S104). For example, when the character recognition module 113 acquires text information of the character area 2 "application guide", the character recognition module 113 notifies the semantic-information storage module 114 of the text information and causes the semantic-information storage module 114 to store the text information.

The area-semantic-attribute presentation module 117 arranges the character areas stored in the semantic-information storage module 114 in the order of likelihood of the analysis results stored in the area-semantic-attribute storage module 116 and causes the display unit 111 to present the character areas to the user on a screen (S105). Such presentation of information by the area-semantic-attribute presentation module 117 is performed on, for example, a GUI screen shown in FIG. 8.

On the GUI screen displayed on the display unit 111, in a window 201 as a preview window, rectangles surrounding the character areas extracted by the document-area analysis module 102 are displayed in addition to an image of the inputted document. Moreover, frames of rectangles surrounding character areas, area semantics of which are analyzed as "title" by the area-semantic analysis module 104, are highlighted in red. In a list box 202, text information of plural character areas, semantics of which are interpreted as "title", is arranged in order of likelihood (reliability) of the character areas as analyzed by the area-semantic analysis module 104 and is displayed as a list in association with the semantic "title". Specifically, in an example shown in FIG. 8, a character area "application guide" is analyzed as most likely to be "title" and a character area "submission destination" is analyzed as second likely to be "title". Therefore, the character areas are displayed in the list box 202 as a list in this order (in order from the character area having the highest reliability).

When there is a candidate that the user determines as not being "title" in the list of the character areas, area semantics of which are analyzed as "title", presented to the user (S106, Yes), the area-semantic setting module 110 excludes the candidate, which is not "title", from the list on the basis of operation input of the user to the operation input unit 112 (S107).

The area-semantic setting module 110 notifies the semantic-information storage module 114 of information indicating that the area semantic of the character area deleted from the list is not "title". A function of providing the user with an operation interface and notifying the semantic-information storage module 114 of a result of the operation is provided by the area-semantic setting module 110. For example, when there is a candidate, an area semantic of which is determined as not being "title" by the user, in the list of the character areas displayed on the list box 202 in the GUI screen shown in FIG. 8, the user selects an item of the candidate in the list box 202 and presses a command button 205 serving as a deletion button. In this way, the user can delete the selected item from the list.

In the list box 202 of the character areas, which are arranged in order of likelihood that area semantics are "title", presented to the user on the display unit 111, when the user determines that the character areas are not arranged in order of likelihood of being "title" (S108, Yes), the area-semantic attribute setting module 118 corrects the candidate order of the character areas in the list on the basis of an operation input of the user to the operation input unit 112 (S109).

Information concerning the arrangement order (the order of likelihood of being "title") of the character areas after the change of the list in which the order is changed in this way is notified to the area-semantic-attribute storage module 116 by the area-semantic-attribute setting module 118. A function of providing the user with an operation interface and notifying the area-semantic-attribute storage module 116 of a result of the operation is provided by the area-semantic-attribute setting module 118.

Figure 8:
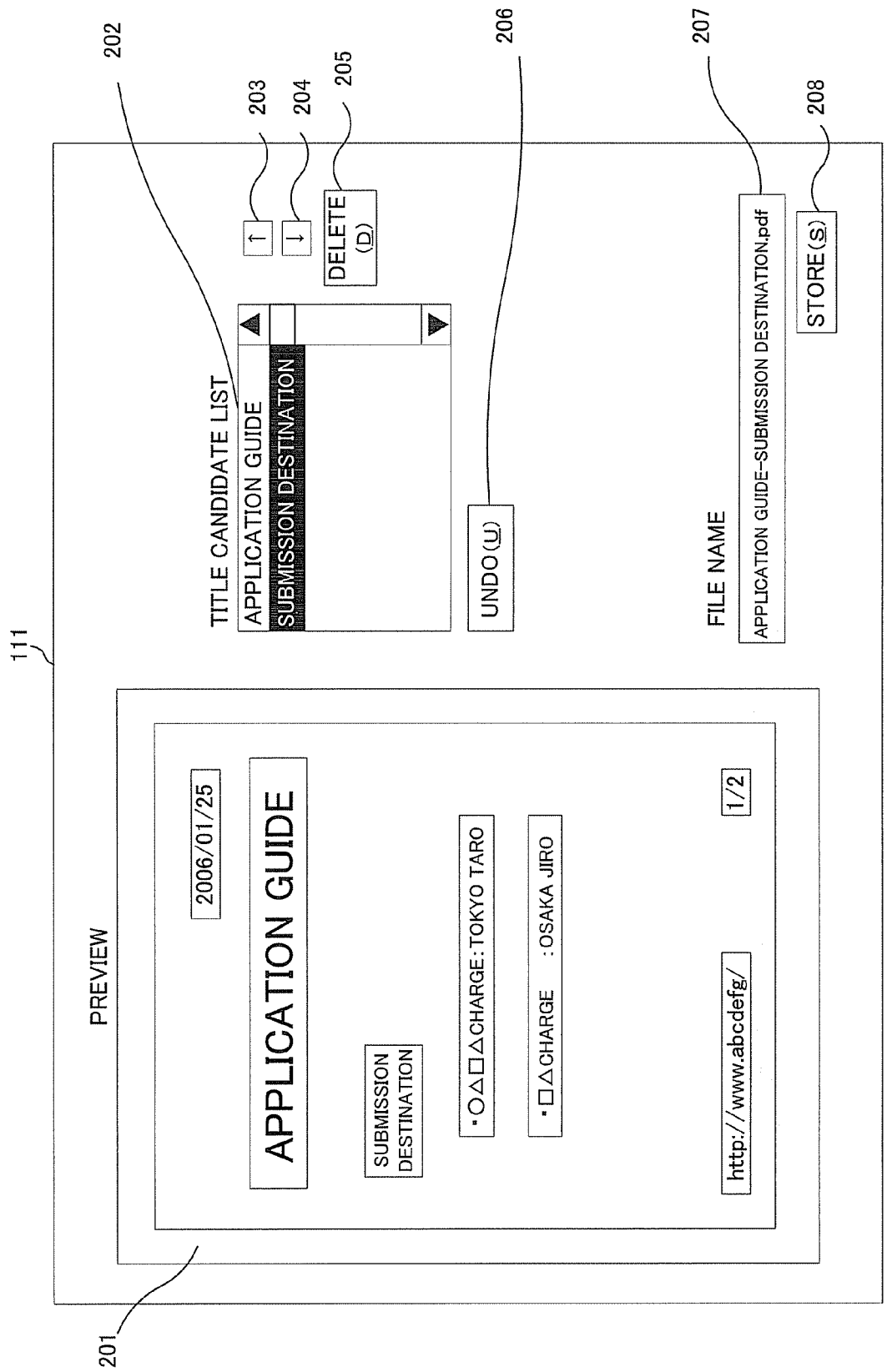
FIG. 8 is a diagram showing an example of a GUI screen displayed on a display unit 111.

For example, when the user selects a certain item from the list of the character areas determined as "title" displayed in the list box 202 on the GUI screen shown in FIG. 8 and presses a command button 203, order of the selected item is replaced with order of an item right above the selected item. When the user presses a command button 204, order of the selected item is replaced with order of an item right below the selected item.

The user can return the list box 202 edited by the command button 205 or the command buttons 203 and 204 to a state presented first by pressing a command button 206.

The area-semantic-attribute setting module 118 connects text information of the character areas, which are arranged in the order of likelihood of being "title", with "-" (hyphen) or the like in the order of the character areas and gives an extension or the like thereto to create a file name (S110). In FIG. 8, as an example, a file name created by connecting text information of the items displayed in the list box 202 with "-" in the order of the items and giving an extension ".pdf" thereto is displayed in a text box 207.

Finally, the processing object image data is stored in a storage device (e.g., the memory 802) with the file name created in S110 given thereto. As a specific operation, for example, when the user presses a command button 208 serving as a storage button, the image data is stored with the text information displayed in the text box 207 set as a file name.

In the GUI screen shown in FIG. 8, the text information of the character areas extracted as "title" is displayed in the text box 207. However, in some case, a recognition result of the character recognition module 113 is wrong and displayed text information is wrong. In such a case, the user can correct the wrong recognition of the character recognition module 113 by directly inputting a text in the text box 207 with an operation input to the operation input unit 112.

In this embodiment, the file name is created using only the text information of the character areas, area semantics of which are "title". However, creation of a file name is not limited to this. It is possible to use text information of other various area semantics, for example, use text information of character areas, area semantics of which are "header", for a file name. As the example of the predetermined processing applied to the processing object image data, the file name is created on the basis of the text information of the specific area semantics. However, it is also possible to use area semantics and text information corrected by the user as keywords of search for image data of a document.

According to this embodiment described above, the user can check objects considered to have a specific semantic in order from an object with a highest ranking in plural objects displayed as a list (an object most likely to have the semantic). Consequently, the user can perform, with a less burden, work for finding, out of a group of objects determined as being likely to have a certain semantic, an object matching the semantic most.

Third Embodiment

A third embodiment of the present invention is explained below.

Figure 9:
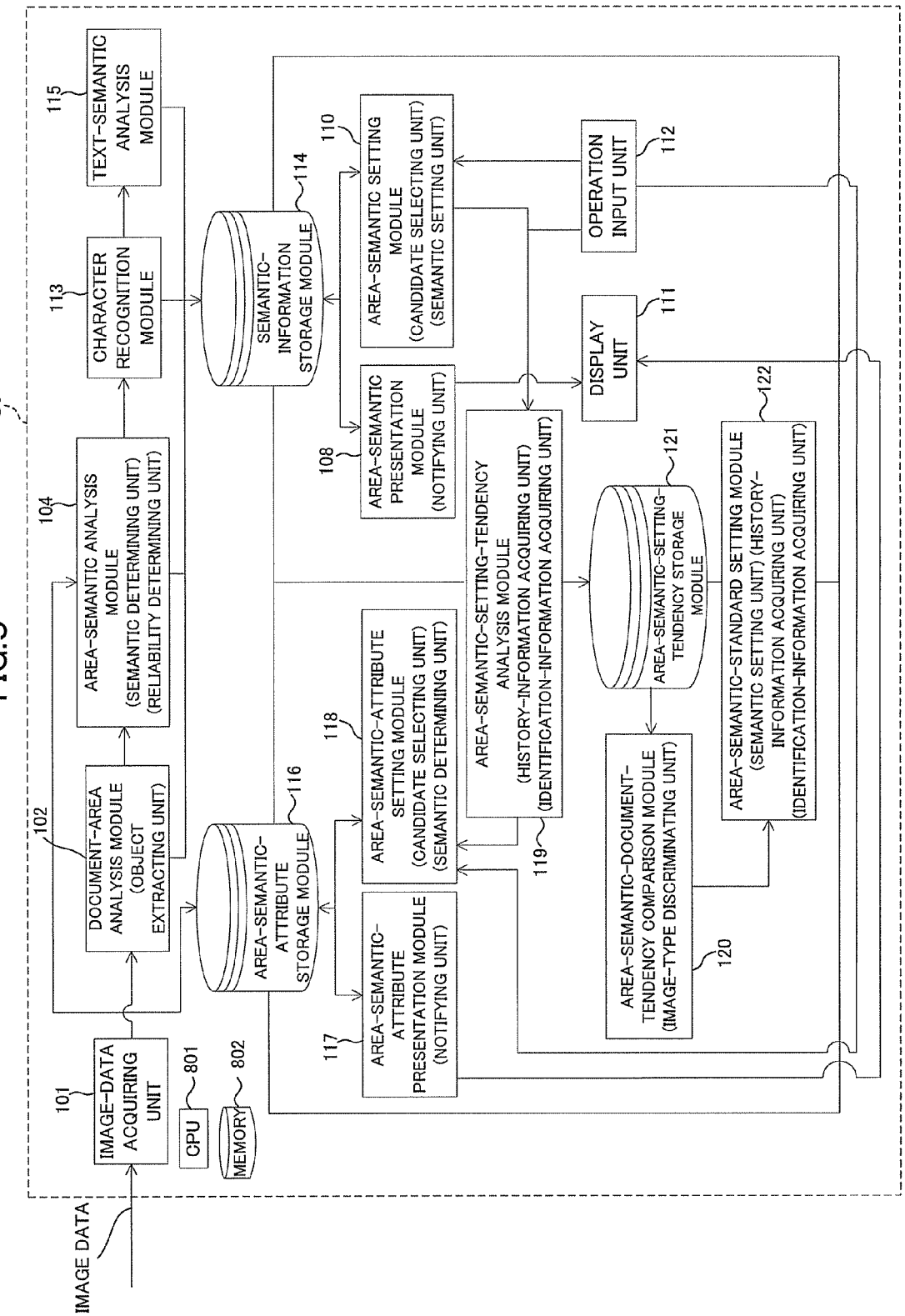
FIG. 9 is a functional block diagram for explaining an image processing system S3 according to a third embodiment of the present invention.

FIG. 9 is a functional block diagram for explaining an image processing system S3 according to the third embodiment.

This embodiment is a modification of the first and second embodiments. Components having functions same as those of the components explained in the first and second embodiments are denoted by the same reference numerals and signs and explanation of the components is omitted. This embodiment is different from the first and second embodiments in a method of correcting a semantic given to an object area extracted from image data.

Specifically, the image processing system S3 according to this embodiment includes an area-semantic-setting-tendency analysis module (equivalent to a history-information acquiring unit and an identification-information acquiring unit) 119, an area-semantic-document-tendency comparison module (equivalent to an image-type discriminating unit) 120, an area-semantic-setting-tendency storage module 121, and an area-semantic-standard setting module (equivalent to the semantic setting unit, the history-information acquiring unit, and the identification-information acquiring unit) 122 in addition to the units of the image processing system S2 according to the second embodiment.

The area-semantic-setting-tendency analysis module (equivalent to the history-information acquiring unit and the identification-information acquiring unit) 119 acquires, with respect to information concerning a document stored in the semantic-information storage module 114, information (a selection history) concerning correction (object selection) operation of a user set via the area-semantic setting module 110 and the area-semantic-attribute setting module 118 and analyzes whether there is a tendency in a method of correction by the user. In order to specify, for each user, content of correction operation performed via the area-semantic setting module 110 and the area-semantic-attribute setting module 118, the area-semantic-setting-tendency analysis module 119 acquires, with respect to a new processing object document, information (ID information and a password inputted in password authentication, information concerning a fingerprint, a pupil, a voice print, and the like acquired in biometric authentication, etc.) for identifying a user who operates the area-semantic setting module 110 and the area-semantic-attribute setting module 118 using the operation input unit 112. User identification information acquired in this way is stored in the semantic-information storage module 114 in association with processing contents thereof (selection, setting, correction, etc.) including that obtained by performing correction operation for a document processed in the past.

The area-semantic-setting-tendency storage module 121 stores content of correction by the user applied to a certain document, which is analyzed by the area-semantic-setting-tendency analysis module 119, in association with the document.

The area-semantic-document-tendency comparison module (the image-type discriminating unit) 120 compares an image of a processing object document, which is acquired by the image-data acquiring unit 101, and an image of a document stored in the area-semantic-setting-tendency storage module 121 and determines whether the images are similar to thereby discriminate a type of image data of the processing object image.

When the area-semantic-document-tendency comparison module 120 determines that image data similar to the image data of the processing object document is stored in the area-semantic-setting-tendency storage module 121, the area-semantic-standard setting module (equivalent to the semantic setting unit, the history-information acquiring unit, and the identification-information acquiring unit) 122 acquires, on the basis of the user identification information acquired by the area-semantic-setting-tendency analysis module 119, information concerning correction operation in the past (an object selection history, etc.), which is applied to a document having the tendency by the user, from the area-semantic-setting-tendency storage module 121. The area-semantic-standard setting module 122 applies correction same as the correction operation to information stored in the semantic-information storage module 114 or the area-semantic-attribute storage module 116. In this way, the area-semantic-standard setting module 122 acquires information concerning a selection history of an object in the area-semantic setting module 110 with respect to the image data of the type discriminated by the area-semantic-document-tendency comparison module 120.

Consequently, it is possible to grasp from history information what kind of semantic is often given to an object in a certain type of image (e.g., a document image of a certain format) and reflect a tendency of the semantic on semantics given to objects.

In this embodiment, a tendency of correction operation in the past of the user concerning an analysis result of area semantics of respective objects included in inputted image data and an analysis result of attributes of the area semantics is analyzed. When a document inputted anew is similar to a document inputted in the past, the correction operation performed by the user in the past is applied to the inputted document in advance and, then, a result of the correction operation is presented to the user.

In the image processing system S3 according to this embodiment, when the image data of the document shown in FIG. 2 is inputted and there are two character areas, area semantics of which are determined as "title", text information of the character areas determined as "title" is displayed on the display unit 111 as a list in order of likelihood of being "title" of the character areas. The user determines that an area semantic of a second candidate of character areas cited as candidates of "title" is not "title" from the result presented on the display unit 111 and performs operation for deleting the second candidate from the candidates in the area-semantic setting module 110.

In this case, information concerning the inputted image and correction operation of the user are recorded in the area-semantic-setting-tendency storage module 121 in advance. When processing object image data is inputted anew, if a layout and the like of the image data are similar to those of image data processed in the past, correction operation of the user applied to the image data in the past is automatically applied to the image data inputted anew. In other words, in this case, the second candidate of the two character areas determined as candidates of "title" is deleted. In this way, a result obtained by deleting the second candidate is presented to the user. Consequently, the user does not have to apply operation for deleting a second character area candidate determined as "title", which is applied to similar image data in the past, to a similar document inputted anew.

Figure 10:
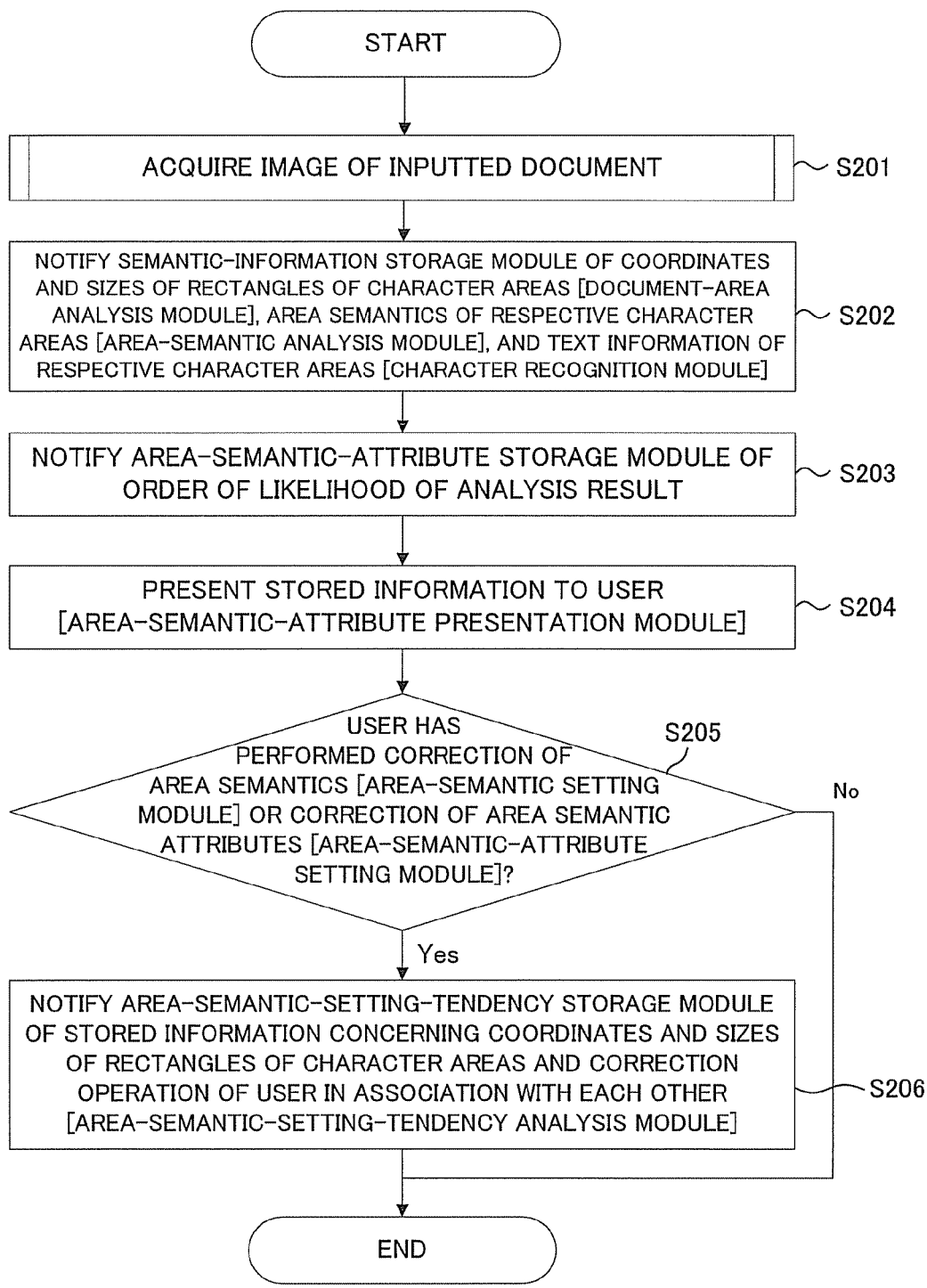
FIG. 10 is a flowchart for explaining processing for acquiring a tendency of correction operation that a user applies to image data of an inputted document.

FIG. 10 is a flowchart for explaining processing for acquiring a tendency of correction operation that the user applies to image data of a document inputted to the document processing system S3.

First, the image-data acquiring unit 101 acquires an image of a document inputted to the document processing system 13 (S201).

Subsequently, analysis of the image of the document is performed. The document-area analysis module 102 analyzes character areas in the document image, notifies the semantic-information storage module 114 of information concerning coordinates (positions, sizes, etc.) of rectangles surrounding the character areas, area semantics of the character areas acquired by the area-semantic analysis module 104, and text information acquired by the character recognition module 113, and causes the semantic-information storage module 114 to store the information, the area semantics, and the text information, respectively (S202).

The area-semantic analysis module 104 notifies the area-semantic-attribute storage module 116 of order of likelihood (a level of reliability) of an analysis result of the area semantics analyzed by the area-semantic analysis module 104 and causes the area-semantic-attribute storage module 116 to store the order (S203).

The area-semantic-attribute presentation module 117 presents information stored in the semantic-information storage module 114 and the area-semantic-attribute storage module 116 to the user (S204).

The user checks the analysis result presented on the display unit 111 and, when necessary, performs correction of the area semantics or correction of area semantic attributes using the area-semantic setting module 110 or the area-semantic-attribute setting module 118, respectively (S205).

When the user has performed correction using the area-semantic setting module 110 or the area-semantic-attribute setting module 118 in the processing in S205 (S205, Yes), the area-semantic-setting-tendency analysis module 119 associates correction operation of the user instructed to the area-semantic setting module 110 or the area-semantic-attribute setting module 118, information concerning the inputted document (the information stored in the semantic-information storage module 114), and information for identifying the user who performs the correction operation, notifies the area-semantic-setting-tendency storage module 121 of the correction operation and the information, and causes the area-semantic-setting-tendency storage module 121 to store the correction operation and the information. (S206).

For example, the area-semantic-setting-tendency analysis module 119 associates, as information concerning image data of the inputted document, coordinates of all the character areas analyzed by the document-area analysis module 102 and correction work for excluding a second candidate from candidates of character areas determined as "title" that the user applied to images similar to a layout of the document of the image data in the past and causes the area-semantic-setting-tendency storage module 121 to store the coordinates and the correction work. FIG. 11 is a diagram showing a state in which coordinates of respective character areas included in image data of a document and contents of correction operation that the user applied to document images similar to the document in the past are stored in the area-semantic-setting-tendency storage module 121 in association with each other.

FIG. 12 is a flowchart for explaining details of the processing in the image processing system S3 according to this embodiment.

The image processing system S3 according to this embodiment applies, when image data of an inputted document is similar to a layout of a document (inputted before) stored in the area-semantic-setting-tendency storage module 121, correction operation of the user, which is applied to the document in the past, to the image data of the document inputted anew and presents the correction operation to the user.

First, the image-data acquiring unit 101 acquires an image of a document inputted to the document processing system 13 (S301).

Subsequently, analysis of the image of the inputted document is performed. The document-area analysis module 102 analyzes character areas in the document image, notifies the semantic-information storage module 114 of information concerning coordinates (positions, sizes, etc.) of rectangles surrounding character areas, area semantics of the character areas acquired by the area-semantic analysis module 104, and text information acquired by the character recognition module 113 in association with each other, and causes the semantic-information storage module 114 to store the information, the area semantics, and the text information (S302).

The area-semantic analysis module 104 notifies the area-semantic-attribute storage module 116 of order of likelihood of an analysis result of the area semantics analyzed by the area-semantic analysis module 104 and causes the area-semantic-attribute storage module 116 to store the order (S303).

The area-semantic-document-tendency comparison module 120 compares the inputted document and documents stored in the area-semantic-setting-tendency storage module 121 and determines whether a document having a layout similar to that of the inputted document is stored in the area-semantic-setting-tendency storage module 121 (S304). Concerning the comparison of the documents, for example, when coordinate information of all character areas extracted from documents inputted in the past are stored in the area-semantic-setting-tendency storage module 121 as shown in FIG. 11, the area-semantic-document-tendency comparison module 120 compares the coordinate information with coordinates of character areas extracted from image data of a document acquired anew by the document-area analysis module 102. When a difference between values of the coordinates is small, the area-semantic-document-tendency comparison module 120 determines that the two documents are similar.

In the example explained here, similarity of documents is determined using only coordinates of character areas included in a document image. However, determination of similarity of documents is not limited to this. For example, it is possible to compare documents using various kinds of information stored in the semantic-information storage module 114 and the area-semantic-attribute storage module 116, for example, determine that two documents are similar using text information extracted from document images when there are many common words included in the documents.

When a document similar to the inputted document is stored in the area-semantic-setting-tendency storage module 121 (S304, Yes), the area-semantic-standard setting module 122 applies correction operation that the user applied in the past to the similar document stored in the area-semantic-setting-tendency storage module 121 to the image data of the document inputted anew (S305).

For example, when the area-semantic-document-tendency comparison module 120 determines that the inputted document is similar to a document A, information of which is stored in the area-semantic-setting-tendency storage module 121 as shown in FIG. 11, the area-semantic-standard setting module 122 executes correction operation that the user applied to the document A stored in the area-semantic-setting-tendency storage module 121, i.e., operation for "excluding a second [title] character area candidate". In other words, the area-semantic-standard setting module 122 instructs the area-semantic setting module 110 to correct an area semantic of a character area, an area semantic of which is analyzed as being second likely to be [title], to an area semantic "not [title]".

When a document similar to the inputted document is stored in the area-semantic-setting-tendency storage module 121 (S304, Yes), the area-semantic-attribute presentation module 117 presents a result obtained by correcting the image data in S305 to the user. When there is no document similar to the inputted document (S304, No), the area-semantic-attribute presentation module 117 presents an analysis result in S302 and S303 to the user (S306).

When the user has corrected the presented contents (S307, Yes), in S308, as in S206 shown in FIG. 10, the area-semantic-setting-tendency analysis module 119 stores the inputted document and the correction operation of the user in the area-semantic-setting-tendency storage module 121 (S308) and the processing is finished. On the other hand, when the user has not corrected the presented contents (S307, No), the processing is finished.

In this embodiment, when there is processed image data similar to processing object image data, correction same as that applied to the processed image data is applied. However, correction of image data is not limited to this. For example, when there are plural processed image data, a layout or the like of which is similar to that of processing object image data, and it is determined by the area-semantic analysis module 104 that plural objects have an identical semantic, the area-semantic-standard setting module 122 may set, on the basis of history information acquired by the area-semantic-setting-tendency analysis module 119, an object most frequently selected in the past among objects displayed as a list by the area-semantic presentation module 108 as an object having a semantic determined by the area-semantic analysis module 104 for the object. By automatically reflecting a history (a tendency) of selection operation in the past on semantic setting processing for an object included in an image in this way, since the user does not need to apply same correction to similar documents every time, it is possible to contribute to improvement of convenience.

In this embodiment, correction processing based on a correction history in the past is performed on the basis of whether there is processed image data similar to processing object image data. However, correction processing is not limited to this. For example, the area-semantic-setting-tendency analysis module 119 may acquire identification information for identifying a user who selects an object and acquire information concerning a selection history of objects by the user corresponding to the acquired identification information. Consequently, it is possible to grasp from history information what kind of semantic a certain user gives to an object in an image and reflect a tendency of a method of selection of the semantic on a semantic given to the object.

When correction contents or the like applied to a document having a certain layout in the past are automatically reflected on a document inputted anew having a layout similar to that of a document inputted in the past, history information of correction operation to be acquired does not always have to be limited to history information of one user. It is also possible to acquire operation histories of plural users belonging to a predetermined group or acquire all histories of correction operation applied to documents having similar layouts in the past regardless of users.

Fourth Embodiment

A fourth embodiment of the present invention is explained below.

FIG. 13 is a functional block diagram showing a configuration of an image processing system S4 according to the fourth embodiment. This embodiment is a modification of the first embodiment. The image processing system S4 according to this embodiment has a configuration in which the area-semantic presentation module 108 and the area-semantic setting module 110 in the image processing system S1 according to the first embodiment are changed to a text-semantic presentation module 123 and a text-semantic setting module 124.

The text-semantic presentation module 123 causes the display unit 111 to display a text semantic stored in the semantic-information storage module 114 on a screen to thereby present the text semantic to a user.

The text-semantic setting module 124 gives means for manually setting, with an operation input to the operation input unit 112, the text semantic stored in the semantic-information storage module 114 to the user.

Consequently, an analysis result of the text semantic stored in the semantic-information storage module 114 is presented to the user by the text-semantic presentation module 123. The user can check the presented analysis result by himself or herself and can check an area analyzed by mistake.

Moreover, the user can set or correct an analysis result of a text semantic outputted by the text-semantic analysis module 115 using the text-semantic-information setting module 124.

Fifth Embodiment

A fifth embodiment of the present invention is explained below.

FIG. 14 is a functional block diagram showing a configuration of an image processing system S5 according to the fifth embodiment. This embodiment is a modification of the fourth embodiment. The image processing system S5 according to this embodiment includes a text-semantic-attribute storage module 125, a text-semantic-attribute presentation module 126, and a text-semantic-attribute setting module 127 in addition to the units of the image processing system S4 according to the fourth embodiment.

The text-semantic-attribute storage module 125 acquires attributes such as likelihood of correctness of a result of a text semantic analyzed by the text-semantic analysis module (equivalent to a character-attribute determining unit) 115 and stores information concerning the attributes. When an object extracted by the document-area analysis module 102 is a character area, the text-semantic analysis module 115 determines an attribute of characters included in the character area. Information concerning the attribute of the characters determined by the text semantic analysis module 115 is stored in the text-semantic-attribute storage module 125.

The determination of likelihood of correctness of a result of a text semantic in the text-semantic analysis module 115 is, for example, in determination of whether a text semantic is "person's name", scoring according to predetermined rules is performed to, for example, give ten points to determination object text information when characters such as "Mr." or "Ms." are present near the text information and determine a text having a higher score obtained as a result of the scoring as a text more highly likely to be "person's name". The predetermined rules for performing determination of likelihood of correctness of a result of the text semantic determination in the text-semantic analysis module 115 are stored in, for example, the memory 802.

The text-semantic-attribute presentation module (an input-candidate display unit) 126 causes the display unit 111 to display information stored in the semantic-information storage module 114 on a screen according to a value of an attribute of a text stored in the text-semantic attribute storage module 125.

The text-semantic-attribute setting module 127 gives means for manually setting, on the basis of an operation input to the operation input unit 112, a value of an attribute stored in the text-semantic-attribute storage module 125 to the user.

In this embodiment, text information of a character area, a text semantic of which is "person's name", is extracted from image data of a document inputted to the image processing system S5. When plural "person's names" are detected from the image data of the inputted document, a list in which the "person's names" are arranged in order desired by the user or in order for placing "person's name", a text semantic determination result of which is more likely to be correct, higher in order is created. A transmission destination in storing an inputted document image changes according to items listed in this "person's name" list or the order.

For example, it is possible to perform processing for transmitting, when text information "person's name", i.e., "Tokyo Taro" is acquired from a document, the document to a transmission destination A, transmitting, when a list including "Tokyo Taro" and "Osaka Jiro" in this order is acquired, the document to a transmission destination B, and transmitting, when person's names are in order of "Osaka Jiro" and "Tokyo Taro", the document to a transmission destination C.

FIG. 15 is a flowchart for explaining details of the processing of the image processing system S5 according to the fifth embodiment. As an example, processing for applying appropriate correction by the user to a result automatically acquired from a document and transmitting the document in accordance with a "person's name" list created on the basis of corrected information is explained. In processing for creating a "person's name" list, a list in which "person's names" are arranged in order desired by the user is created.

First, the image-data acquiring unit 101 acquires image data of a document inputted to the image processing system S5 (S401).

Subsequently, the document-area analysis module 102 analyzes character areas in a document image and acquires coordinates (positions, sizes, etc.) of rectangles surrounding the character areas (S402). The document-area analysis module 102 notifies the semantic-information storage module 114 of information acquired in this way and stores the information therein.

The character recognition module 113 acquires text information of the character areas. The character recognition module 113 stores the acquired text information in the semantic-information storage module 114. For example, when text information "application guide" is acquired for the character area 2, the character recognition module 113 stores the text information in the semantic-information storage module 114 (S403).

The text-semantic analysis module 115 acquires text semantics of text information in extracted character areas. The text-semantic analysis module 115 causes the semantic-information storage module 114 to store information concerning the acquired text semantics. At this point, the text-semantic analysis module 115 gives, in order of text information desired by the user, order to all pieces of text information to which text semantics are given. The text-semantic analysis module 115 notifies the text-semantic-attribute storage module 125 of this order as an attribute and causes the text-semantic-attribute storage module 125 to store the order (S404).

For example, in the image data of the document having the layout shown in FIG. 2, text semantics of text information "Tokyo Taro" and "Osaka Jiro" are analyzed as "person's names". This analysis result is stored in the semantic-information storage module 114. Moreover, with respect to the text information to which the text semantics are given by the text-semantic analysis module 115, the text-semantic analysis module 115 causes the text-semantic-attribute storage module 125 to store, as an attribute, order desired by the user indicating that "Tokyo Taro" is "person's name" most desired by the user and "Osaka Jiro" is "person's name" secondly desired by the user. FIG. 16 is an example of a data table showing text semantic attributes stored in the text-semantic-attribute storage module 125.

Figure 17:
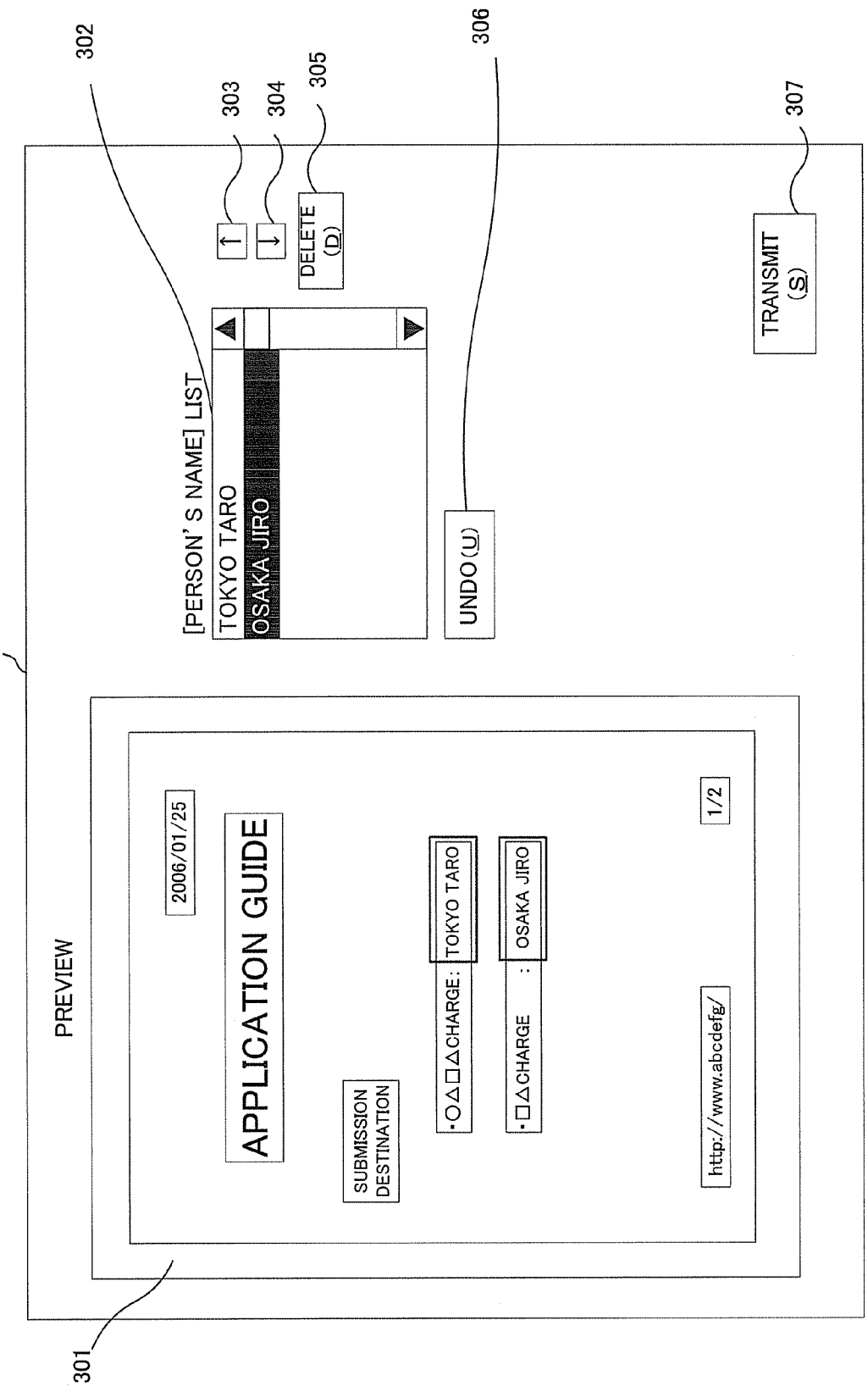
FIG. 17 is a diagram showing an example of display of a GUI displayed on the display unit 111 by a text-semantic-attribute presentation module 126.

The text-semantic-attribute presentation module 126 arranges the text information stored in the semantic-information storage module 114 in the order desired by the user stored in the text-semantic-attribute storage module 125 and causes the display unit 111 to display the text information (S405). FIG. 17 is a diagram showing an example of display of a GUI displayed on the display unit 111 by the text-semantic-attribute presentation module 126. As shown in the figure, the text-semantic-attribute presentation module 126 determines, when an object to be extracted is a character, an attribute of the character and causes the display unit 111 to display the character, an attribute of which is determined, as an input character candidate in predetermined processing in which a character of the attribute determined for the character should be used as an input.

In a GUI screen shown in FIG. 17, in a window 301 as a preview window, rectangles surrounding character areas extracted by the document-area analysis module 102 are displayed in addition to an image of an inputted document. Moreover, frames of rectangles surrounding characters, text semantics of which are analyzed as "person's name" by the text-semantic analysis module 115, are highlighted in red. In a list box 302, text information, a semantic of which is analyzed as "title" by the area-semantic analysis module 104, is arranged in the order desired by the user given by the text-semantic analysis module 115 and is displayed as a list.

For example, in the example shown in FIG. 17, a character area "Tokyo Taro" is analyzed as "person's name" most desired by the user and a character area "Osaka Jiro" is analyzed as "person's name" secondly desired by the user. Therefore, the character areas are displayed in the list box 302 as a list in this order.

When there is a candidate considered not to be "person's name" determined and desired by the user in the list of text information, a text semantic of which is analyzed as "person's name", presented to the user on the display unit 111 (S406, Yes), the text-semantic setting module 124 excludes the candidate on the basis of an operation input to the operation input unit 112.

At this point, the text-semantic setting module 124 notifies the semantic-information storage module 114 of information indicating that the text semantic of the text information deleted from the list is not "person's name" (S407).

For example, when there is a candidate, a text semantic of which is determined as not being "person's name" (S408, Yes), the user selects an item of the candidate from the list displayed in the list box 302 on the GUI screen and presses a command button 305 serving as a deletion button. Consequently, the selected item is deleted from the list.

The text-semantic-attribute setting module 127 performs operation for correcting, on the basis of an operation input to the operation input unit 112, order of a candidate considered not to be "person's name" order determined and desired by the user in the list of text information, a text semantic of which is "person's name", arranged in the order desired by the user (S409).

At this point, the text-semantic-attribute setting module 127 notifies the text-semantic-attribute storage module 125 of information concerning the change in the order of "person's names" desired by the user.

For example, when the user selects an arbitrary item from the list of "person's names" displayed in the list box 302 on the GUI screen and presses the command button 303, order of the selected item is replaced with order of an item right above the selected item. When the user presses the command button 304, order of the selected item is replaced with order of an item right below the selected item.

The user can return the list box 302 edited by the command button 305 or the command buttons 303 and 304 to a state presented first by pressing a command button 306.

The user determines a transmission destination of the document on the basis of the list in which "person's names" are arranged in the order of "person's names" desired by the user (S410). The transmission destination is defined in advance and determined in accordance with contents of the list.

Finally, the user transmits the inputted document to the transmission destination determined in the processing in S410 (S411). For example, when the user presses a command button 307 serving as a transmission button, transmission of the document is started.

In the GUI screen shown in FIG. 17, text information of the character areas extracted as "person's name" is displayed in the text box 302. However, in some case, a recognition result of the character recognition module 113 is wrong and displayed text information is wrong. In such a case, the user can correct the wrong recognition of the character recognition module 113 by directly inputting a text in the text box 302 using the operation input unit 112.

In the example explained in this embodiment, the text information, a text semantic of which is "person's name", is used for selection of a transmission destination of document data. However, text information used for selection of a transmission destination is not limited to this. For example, it is also possible to use text information having various text semantics such as text information, a text semantic of which is "date".

A method of using information concerning an acquired text semantic is not limited to the selection of a transmission destination. For example, it is also possible to urge the user to correct the acquired text semantic and use corrected text semantic information for search for a document from which the text semantic is extracted.

As described above, the text-semantic-attribute presentation module 126 according to this embodiment causes the display unit 111 to display a character, an attribute of which is determined by the text-semantic analysis module 115, as an input character candidate in predetermined processing in which a character of the attribute determined for the character should be used as an input. Consequently, the user can perform, by selecting a character having a certain attribute (e.g., a person's name, a telephone number, or an address) out of input character candidates, character input in processing in which a character having the attribute is used as an input. Therefore, it is possible to substantially reduce a burden of the character input.

Sixth Embodiment

A sixth embodiment of the present invention is explained below.

Figure 18:
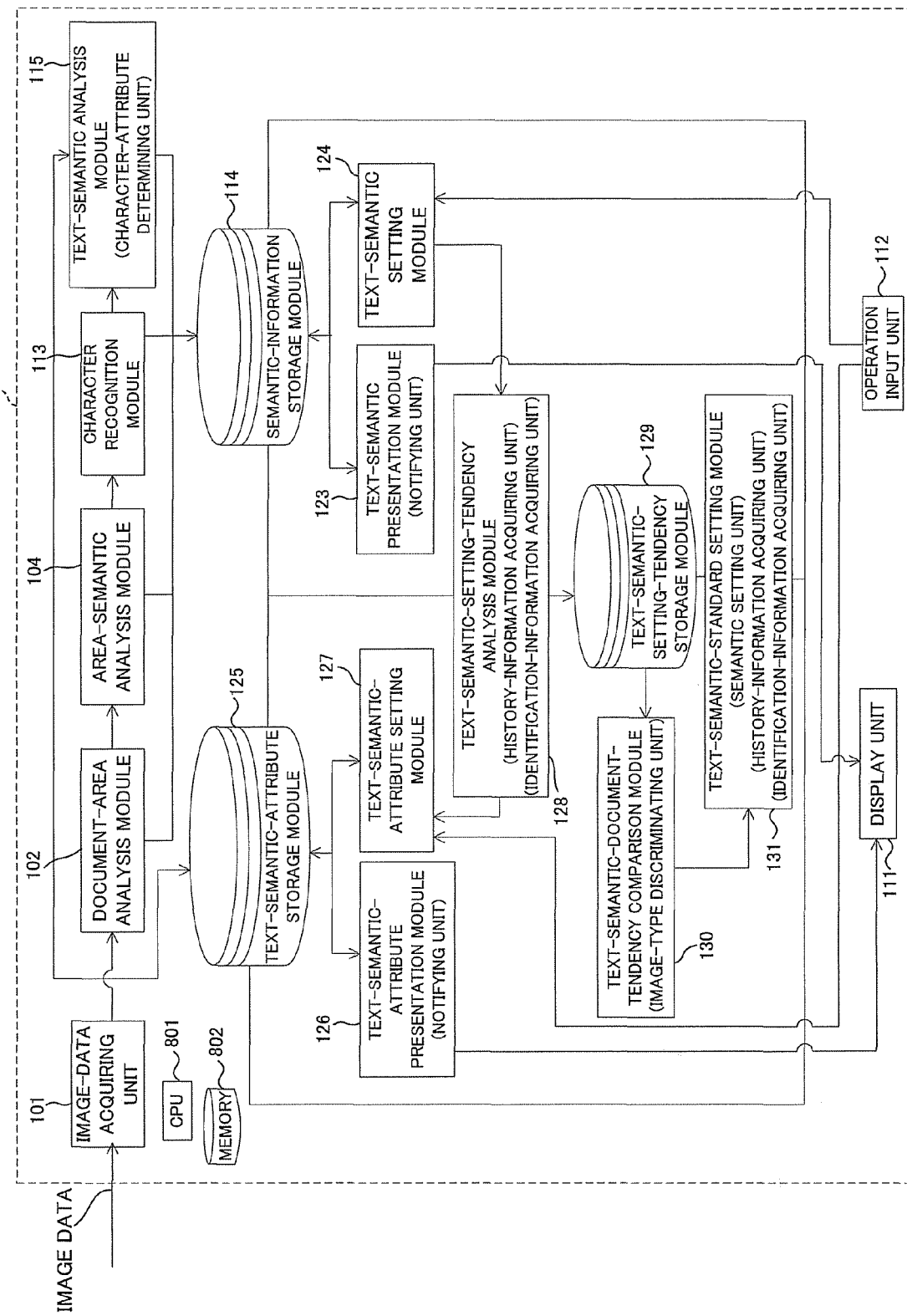
FIG. 18 is a functional block diagram showing a configuration of an image processing system S6 according to a sixth embodiment of the present invention.

This embodiment is a modification of the fifth embodiment. Components having functions same as those of the components explained in the fifth embodiment are denoted by the same reference numerals and signs and explanation of the components is omitted. This embodiment is different from the fifth embodiment in a method of correcting an attribute given to text information extracted from image data. FIG. 18 is a functional block diagram showing a configuration of an image processing system S6 according to the sixth embodiment.

Specifically, the image processing system S6 according to this embodiment includes a text-semantic-setting-tendency analysis module (equivalent to the history-information acquiring unit and the identification-information acquiring unit) 128, a text-semantic-document-tendency comparison module (equivalent to the image-type discriminating unit) 130, a text-semantic-setting-tendency storage module 129, and a text-semantic-standard setting module (equivalent to the semantic setting unit, the history-information acquiring unit, and the identification-information acquiring unit) 131 in addition to the units of the image processing system S5 according to the fifth embodiment.

The text-semantic-setting-tendency analysis module 128 analyzes whether there is a tendency in correction contents of a user set for information of a document stored in the semantic-information storage module 114 via the text-semantic setting module 124 and the text-semantic-attribute setting module 127.

The text-semantic-setting-tendency storage module 129 stores contents of correction operation of the user applied to a certain document analyzed by the text-semantic-setting-tendency analysis module 128 and information for identifying the document in pairs.

The text-semantic-document-tendency comparison module 130 compares a layout of a document of processing object image data and a layout of a document stored in the text-semantic-setting-tendency storage module 129 and determines whether both the layouts are similar to each other.

When the text-semantic-document-tendency comparison module 130 determines that a document similar to the processing object document is stored in the text-semantic-setting-tendency storage module 129, the text-semantic-standard setting module 131 acquires information concerning correction operation in the past that the user applied to documents having that tendency from the text-semantic-setting-tendency storage module 129. The text-semantic-standard setting module 131 reflects operation contents of the correction operation on information concerning a processing object document stored in the semantic-information storage module 114 or the text-semantic-attribute storage module 125.

In this embodiment, a tendency of correction operation of the user concerning a text semantic analysis result and a text semantic attribute analysis result for an inputted processing object document is analyzed. When a layout or the like of a document inputted anew is similar to that of documents processed in the past, correction operation that the user applied to a document image of the document inputted in the past is automatically applied to the document inputted anew in advance and, then, a result obtained by automatically correcting the document image is presented to the user.

For example, in the image processing system S6 according to this embodiment, when a document image including the objects arranged in the layout shown in FIG. 2 is acquired, text information of two character areas, text semantics of which are "person's name", is displayed on the display unit 111 as a list in order desired by the user. Here, it is assumed that the user determines that a second item in items of "person's name" displayed as a list does not have a text semantic "person's name" from a result displayed as a list on the display unit 111 and performs operation for deleting the second item from the list. Information concerning an inputted document image 1 and correction operation of the user are recorded as history information. Subsequently, when image data of a processing object document is inputted to the image processing system S6 anew, if a layout of the image data of the processing object document inputted anew is similar to a layout or the like of image data of a document processed in the past, correction operation of the user applied to the document image processed in the past is automatically reflected on the image data of the document inputted anew. In this case, a second item among items of a "person's name" list obtained as a result of the analysis of the image data of the document inputted anew is automatically deleted. By presenting the "person's name" list from which the second item is deleted in this way to the user, the user does not have to apply the correction operation applied to the image data of the similar document in the past to the new processing object document.

Figure 19:
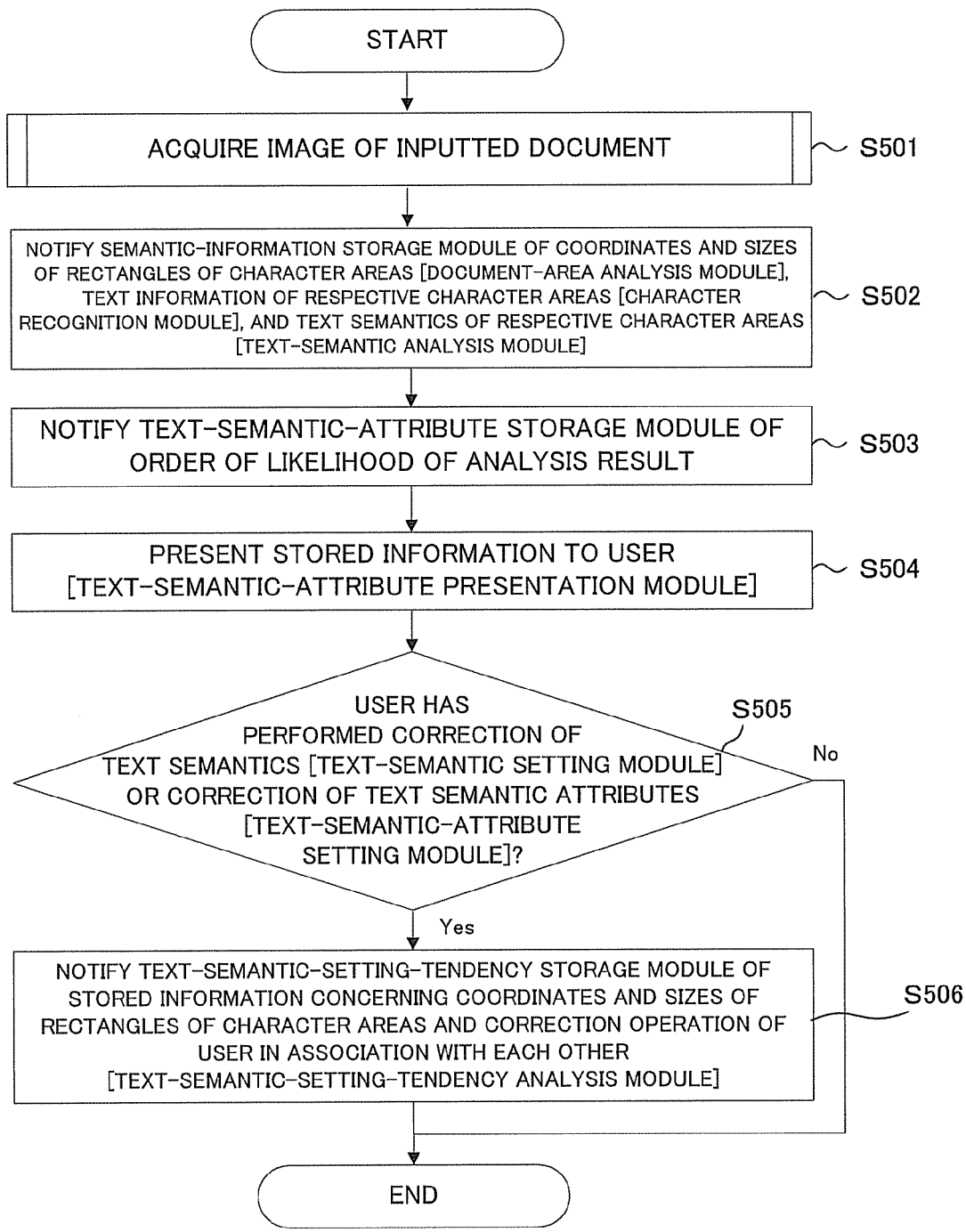
FIG. 19 is a flowchart showing details of processing in the image processing system S6 according to the sixth embodiment.

FIG. 19 is a flowchart showing details of the processing in the image processing system S6 according to the sixth embodiment.

Processing for acquiring a tendency of correction operation that the user applies to a document inputted to the image processing system S6 is described.

First, the image-data acquiring unit 101 acquires image data of a document inputted to the document processing system 23 (S501).

Subsequently, the document-area analysis module 102 analyzes character areas in a document image and acquires information concerning coordinates (positions, sizes, etc.) of rectangles surrounding the character areas. The character recognition module 113 recognizes text information of character areas extracted by the document-area analysis module 102. The text-semantic analysis module 115 recognizes a text semantic of the text information recognized by the character recognition module 113. Various kinds of information acquired by the document-area analysis module 102, the character recognition module 113, and the text-semantic analysis module 115 in this way are stored in the semantic-information storage module 114 (S502).

The text-semantic analysis module 115 causes the text-semantic-attribute storage module 125 to store, as an attribute, display order desired by the user in list display of the text semantic analyzed by the text-semantic analysis module 115 (S503).

The text-semantic-attribute presentation module 126 causes the display unit 111 to display the information stored in the semantic-information storage module 114 and the text-semantic-attribute storage module 125 on a screen and presents the information to the user (S504).

As a result of checking an analysis result presented on the display unit 111, when the user has performed correction of the text semantic or the text semantic attribute using the text-semantic setting module 124 or the text-semantic-attribute setting module 127 (S505, Yes), processing in S506 is executed. Specifically, the text-semantic-setting-tendency analysis module 128 causes the text-semantic-setting-tendency storage module 129 to store information concerning the image data of the inputted document (i.e., the information stored in the semantic-information storage module 114) and information indicating contents of the correction operation of the user applied to the document via the text-semantic setting module 124 or the text-semantic-attribute setting module 127 in association with each other (S506).

For example, as information concerning an inputted document, information indicating positions (coordinates, etc.) of all the character areas analyzed by the document-area analysis module 102 and information concerning contents of correction work that the user applied to a document having a layout similar to that of the inputted document in the past are stored in the text-semantic-setting-tendency storage module 129 in association with each other.

FIG. 20 shows a state in which coordinate information in documents of objects such as character areas included in images of image data of the documents and contents of correction operation that the user applied in the past to attribute information and the like determined for these character areas are stored in pairs in the text-semantic-setting-tendency storage module 129.

When a layout of a document inputted anew to the image processing system S6 according to this embodiment as a processing object is similar to a layout of a document (inputted in the past) stored in the text-semantic-setting-tendency storage module 129, correction of contents same as correction operation of the user applied to the document inputted in the past is automatically applied to the document inputted anew and presented to the user. This processing is explained below.

FIG. 21 is a flowchart for explaining details of processing for reflecting correction operation in the past on a document inputted anew in the sixth embodiment.

First, the image-data acquiring unit 101 acquires image data of a document inputted to the document processing system S6 (S601).

Subsequently, the document-area analysis module 102 analyzes objects such as character areas in an image of the image data of the document and acquires information concerning coordinates (positions, sizes, etc.) of rectangles surrounding the respective character areas. The character recognition module 113 recognizes text information from character areas extracted from the image by the document-area analysis module 102. The text-semantic analysis module 115 recognizes a text semantic of the text information recognized by the character recognition module 113. In this way, various kinds of information acquired by the document-area analysis module 102, the document recognition module 113, and the text-semantic analysis module 115 are stored in the semantic-information storage module 114 (S602).

The text-semantic analysis module 115 causes the text-semantic-attribute storage module 125 to store, as an attribute, display order desired by the user in list display of the text semantic analyzed by the text-semantic analysis module 115 (S603).

The text-semantic-document-tendency comparison module 128 performs comparison and determination processing to determine whether information concerning a document having a layout similar to that of the document inputted anew as a processing object is stored in the text-semantic-setting-tendency storage module 129 (S604).

Concerning comparison of documents by the text-semantic-document-tendency comparison module 128, for example, as shown in FIG. 20, when information concerning coordinate values of all character areas extracted from documents inputted in the past is stored in the text-semantic-setting-tendency storage module 129, the text-semantic-document-tendency comparison module 128 compares the coordinate values with coordinate values of character areas extracted from image data of the document inputted anew acquired by the document-area analysis module 102. When a difference between the coordinate values is small, the text-semantic-document-tendency comparison module 128 determines that the two documents are similar.

In the example explained above, similarity of documents is determined using only coordinates of the character areas included in the document image (information concerning a layout of objects in the document). However, determination of similarity of documents is not limited to this. It is also possible to compare documents using various kinds of information stored in the semantic-information storage module 114 and the area-semantic-attribute storage module 125, for example, determine that two documents to be compared are similar using text information of character areas included in images of the documents when there are many common words included in the documents.

When information concerning a document having a layout similar to that of the document inputted to the image processing system S6 is stored in the text-semantic-setting-tendency storage module 129 (S604, Yes), the text-semantic-standard setting module 131 automatically applies correction processing, which is stored in the text-semantic-setting-tendency storage module 129, having contents same as those of correction operation that the user applied to documents, which are similar to the document inputted anew, in the past to the image data of the document inputted anew.

Specifically, when the text-semantic-document-tendency comparison module 130 determines that the document inputted to the image processing system S6 anew is similar to a document A, information of which is stored in the text-semantic-setting-tendency storage module 129 as shown in FIG. 20 (S604, Yes), the text-semantic-standard setting module 131 applies correction processing having contents same as those of correction operation that the user applied to the document A stored in the text-semantic-setting-tendency storage module 129 to the image data of the document inputted anew. Here, the text-semantic-standard setting module 131 instructs the text-semantic setting module 124 to correct text information, a text semantic of which is analyzed as "person's name" and order desired by the user of which is analyzed as second, to text information, a text semantic of which is not "person's name".

When information concerning a document having a layout similar to that of the document inputted to the image processing system S6 anew is present in the text-semantic-setting-tendency storage module 129 (S604, Yes), the text-semantic-attribute presentation module 126 causes the display unit 111 to present a result obtained by correcting the text information to the user (S605). When there is no information concerning a similar document (S604, No), the text-semantic-attribute presentation module 126 causes the display unit 111 to present analysis results in S602 and S603 to the user (S606).

When the user has corrected contents of the text semantic or the text semantic attribute presented by the display unit 111 (S607, Yes), the text-semantic-setting-tendency analysis module 128 stores the new inputted document, determination contents of the semantic and the attribute of which are corrected, and correction operation of the user in the text-semantic-setting-tendency storage module 129 in association with each other (S608) and the processing is finished. On the other hand, when the user has not corrected the contents presented by the display unit 111 (S607, No), the processing is finished.

In the examples explained in the respective embodiments, objects extracted from an image of image data of a document are mainly character areas. However, objects extracted from an image are not limited to this. It goes without saying that objects such as figures and photograph images that can be included in a normal document can be objects of extraction.

In the examples explained in the respective embodiments, objects and a semantic determination result concerning the objects are displayed on a screen to notify the user of the objects and the semantic determination result. However, a method of notification is not limited to this. For example, the objects and the semantic determination results may be notified with sound.

In the examples explained in the respective embodiments, semantic determination processing based on predetermined rules is applied to scanned image data and selection by the candidate selecting unit and semantic setting corresponding to a user or a document type by the semantic setting unit are applied to a processing result of the determination processing. However, the semantic determination processing is not limited to this. For example, the semantic determination processing may be applied to scanned image data on the basis of rules determined in advance according to a user or a document type.

By adopting such a processing algorithm, it is possible to reduce processing steps for selecting appropriate semantics given to objects in the embodiments.

The respective steps in the processing in the image processing system are realized by causing the CPU 801 to execute an image processing program stored in the memory 802.

In the explanation of the embodiments, the functions for carrying out the invention are recorded in an apparatus in advance. However, the same functions may be downloaded from a network to the apparatus or the same functions stored in a recording medium may be installed in the apparatus. A form of the recording medium may be any form as long as the recording medium can store the program such as CD-ROM the apparatus can read the recording medium. The functions obtained by the installation and the download in this way may be realized through cooperation with an OS (Operating System) and the like in the apparatus.

The present invention has been explained in detail with reference to the specific forms. However, it would be obvious for those skilled in the art that various alterations and modifications are possible without departing from the spirit and the scope of the present invention.

As described in detail above, according to the present invention, it is possible to provide a technique that can contribute to a reduction in an operation burden in managing a processing result of the semantic determination processing applied to objects included in an image.

What is claimed is:

1. An image processing system comprising:
   an image-data acquiring unit configured to acquire image data;
   an object extracting unit configured to extract an object included in an image of the image data acquired by the image-data acquiring unit;
   a semantic determining unit configured to determine, on the basis of predetermined determination rules, a semantic of the object extracted by the object extracting unit in a layout of the image data; and
   a notifying unit configured to cause a display unit to notify, when it is determined by the semantic determining unit that plural objects have an identical semantic, information concerning the plural objects, which are determined as having the semantic, in association with information concerning the semantic.

2. An image processing system according to claim 1, wherein the notifying unit causes the display unit to display, when it is determined by the semantic determining unit that plural objects have an identical semantic, information concerning the plural objects, which are determined as having the semantic, as a list in association with information concerning the semantic.

3. An image processing system according to claim 2, further comprising:
   a candidate selecting unit configured to select, on the basis of an operation input of a user, any one of the objects, which the display unit is caused to display as a list by the notifying unit; and
   a semantic setting unit configured to set the object selected by the candidate selecting unit as an object having a semantic determined for the object by the semantic determining unit.

4. An image processing system according to claim 3, further comprising a history-information acquiring unit configured to acquire information concerning a history of selection of objects by the candidate selecting unit, wherein
   the semantic setting unit sets, when it is determined by the semantic determining unit that plural objects have an identical semantic, on the basis of the history information acquired by the history-information acquiring unit, an object most frequently selected in the past among the objects, which the display unit is caused to display as a list by the notifying unit, as an object having a semantic determined for the objects by the semantic determining unit.

5. An image processing system according to claim 4, further comprising an identification-information acquiring unit configured to acquire identification information for identifying a user who performs the selection of an object by the candidate selecting unit, wherein
   the history-information acquiring unit acquires information concerning a history of selection of objects in the candidate selecting unit by the user corresponding to the identification information acquired by the identification-information acquiring unit.

6. An image processing system according to claim 4, further comprising an image-type determining unit configured to determine a type of the image data acquired by the image-data acquiring unit, wherein
   the history-information acquiring unit acquires information concerning a history of selection of objects in the candidate selecting unit for the image data of the type determined by the image-type determining unit.

7. An image processing system according to claim 4, further comprising:
   a character-attribute determining unit configured to determine, when the object extracted by the object-extracting unit is a character, an attribute of the character; and
   an input-candidate display unit configured to cause the display unit to display the character, an attribute of which is determined by the character-attribute determining unit, as an input character candidate in predetermined processing in which a character of the attribute determined for the character should be used as an input.

8. An image processing system according to claim 1, further comprising a reliability determining unit configured to determine reliability of semantic determination processing in the semantic determining unit, wherein
   the notifying unit causes the display unit to display, when it is determined by the semantic determining unit that plural objects have an identical semantic, the plural objects, which are determined as having the semantic, as a list in association with the semantic in order from an object having highest reliability determined by the reliability determining unit.

9. An image processing method comprising:
   acquiring image data;
   extracting an object included in an image of the acquired image data;
   determining, on the basis of predetermined determination rules, a semantic of the extracted object in a layout of the image data; and
   causing a display unit to notify, when it is determined that plural objects have an identical semantic, information concerning the plural objects, which are determined as having the semantic, in association with information concerning the semantic.

10. An image processing method according to claim 9, further comprising causing the display unit to display, when it is determined that plural objects have an identical semantic, information concerning the plural objects, which is determined as having the semantic, as a list in association with information concerning the semantic.

11. An image processing method according to claim 10, further comprising:
   selecting, on the basis of an operation input of a user, any one of the objects, which the display unit is caused to display as a list; and
   setting the selected object as an object having a semantic determined for the object.

12. An image processing method according to claim 11, further comprising:

acquiring information concerning a history of selection of objects based on an operation input of the user; and setting, when it is determined that plural objects have an identical semantic, on the basis of the acquired history information, an object most frequently selected in the past among the objects, which the display unit is caused to displayed as a list, as an object having a semantic determined for the objects.

13. An image processing method according to claim 12, further comprising:

acquiring identification information for identifying a user who performs the selection of an object; and acquiring information concerning a history of selection of objects by the user corresponding to the acquired identification information.

14. An image processing method according to claim 12, further comprising:

determining a type of the acquired image data; and acquiring information concerning a history of selection of objects for the determined image data of the type.

15. An image processing method according to claim 12, further comprising:

determining, when the extracted object is a character, an attribute of the character; and causing the display unit to display the character, an attribute of which is determined, as an input character candidate in predetermined processing in which a character having the attribute determined for the character should be used as an input.

16. An image processing method according to claim 9, further comprising:

determining reliability of processing for determining the semantic; and causing the display unit to display, when it is determined that plural objects have an identical semantic, the plural objects, which are determined as having the semantic, as a list in association with the semantic in order from an object having highest reliability determined.

17. A non-transitory computer readable medium storing an image processing program that causes a computer to execute processing for:

acquiring image data;

extracting an object included in an image of the acquired image data;

determining, on the basis of predetermined determination rules, a semantic of the extracted object in a layout of the image data; and causing a display unit to notify, when it is determined that plural objects have an identical semantic, information concerning the plural objects, which are determined as having the semantic, in association with information concerning the semantic.

18. A non-transitory computer readable medium storing an image processing program according to claim 17, further causing the computer to execute processing for causing the display unit to display, when it is determined that plural objects have an identical semantic, information concerning the plural objects, which are determined as having the semantic, as a list in association with information concerning the semantic.

19. A non-transitory computer readable medium storing an image processing program according to claim 18, further causing the computer to execute processing for:

selecting, on the basis of an operation input of a user, any one of the objects, which the display unit is caused to display as a list; and setting the selected object as an object having a semantic determined for the object.

20. A non-transitory computer readable medium storing an image processing program according to claim 17, further causing the computer to execute processing for:

determining reliability of processing for determining the semantic; and causing the display unit to display, when it is determined that plural objects have an identical semantic, the plural objects, which are determined as having the semantic, as a list in association with the semantic in order from an object having highest reliability determined.

* * * * *